(12) United States Patent
Westerhoff et al.

(10) Patent No.: US 11,760,663 B2
(45) Date of Patent: Sep. 19, 2023

(54) FIBER-OPTIC INTEGRATED MEMBRANE REACTOR

(71) Applicants: Paul K. Westerhoff, Scottsdale, AZ (US); Kiril D. Hristovski, Gilbert, AZ (US); Shahnawaz Sinha, Chandler, AZ (US)

(72) Inventors: Paul K. Westerhoff, Scottsdale, AZ (US); Kiril D. Hristovski, Gilbert, AZ (US); Shahnawaz Sinha, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 7 days.

(21) Appl. No.: 17/063,510

(22) Filed: Oct. 5, 2020

(65) Prior Publication Data

US 2021/0032130 A1 Feb. 4, 2021

Related U.S. Application Data

(62) Division of application No. 15/499,433, filed on Apr. 27, 2017, now Pat. No. 10,793,449.
(Continued)

(51) Int. Cl.
*C25B 1/04* (2021.01)
*C25B 9/00* (2021.01)
(Continued)

(52) U.S. Cl.
CPC ............. *C02F 1/467* (2013.01); *C02F 1/32* (2013.01); *C02F 3/005* (2013.01); *C02F 3/325* (2013.01); *H01G 9/2031* (2013.01); *H01G 9/2095* (2013.01); *C02F 2103/06* (2013.01); *C02F 2201/3222* (2013.01);
(Continued)

(58) Field of Classification Search
CPC .. C02F 1/467; C02F 1/32; C02F 3/005; C02F 3/325; C02F 2103/06; C02F 2201/3222; C02F 2201/46115; C02F 2305/023; C02F 2305/10; H01G 9/2031; H01G 9/2095; Y02W 10/37
See application file for complete search history.

(56) References Cited

U.S. PATENT DOCUMENTS 4,140,581 A 2/1979 Fong et al.
5,637,877 A 6/1997 Sinofsky
(Continued)

FOREIGN PATENT DOCUMENTS

CN 1612754 5/2005
ES 2673673 6/2018
(Continued)

OTHER PUBLICATIONS

Ibhadon, Alex Omo, and Paul Fitzpatrick. "Heterogeneous photocatalysis: recent advances and applications." Catalysts 3.1 (2013): 189-218.
(Continued)

*Primary Examiner* — Zulmariam Mendez
(74) *Attorney, Agent, or Firm* — Fish & Richardson P.C.

(57) ABSTRACT

A reactor for water splitting or water treatment includes a first electrode, a second electrode electrically coupled to the first electrode, and a proton exchange membrane separating the first electrode and the second electrode. The first electrode includes a first optical fiber coated with a photocatalytic material.

19 Claims, 11 Drawing Sheets

Related U.S. Application Data

(60) Provisional application No. 62/328,352, filed on Apr. 27, 2016.

(51) Int. Cl.
    *C02F 1/467*     (2023.01)
    *H01G 9/20*     (2006.01)
    *C02F 1/32*     (2023.01)
    *C02F 3/32*     (2023.01)
    *C02F 3/00*     (2023.01)
    *C02F 103/06*     (2006.01)

(52) U.S. Cl.
    CPC ............. *C02F 2201/46115* (2013.01); *C02F 2305/023* (2013.01); *C02F 2305/10* (2013.01); *Y02W 10/37* (2015.05)

(56) References Cited

U.S. PATENT DOCUMENTS

| | | |
|---|---|---|
| 5,875,384 A | 2/1999 | Peill et al. |
| 5,905,837 A | 5/1999 | Wang et al. |
| 6,347,172 B1 | 2/2002 | Keller et al. |
| 6,418,252 B1 | 7/2002 | Maitland |
| 6,501,893 B1 | 12/2002 | Iimura |
| 7,566,157 B2 | 7/2009 | Lo |
| 8,331,750 B2 | 12/2012 | Deng et al. |
| 8,492,448 B2 | 7/2013 | Dewa et al. |
| 8,929,703 B2 | 1/2015 | Logunov et al. |
| 9,259,513 B2 | 2/2016 | Bedwell et al. |
| 9,304,278 B1 | 4/2016 | Bauco et al. |
| 9,618,672 B2 | 4/2017 | Kuchinisky et al. |
| 9,751,785 B2 | 9/2017 | Doudrick et al. |
| 9,878,320 B2 | 1/2018 | Hristovski et al. |
| 10,092,356 B2 | 10/2018 | Griffin et al. |
| 10,175,405 B2 | 1/2019 | Logunov et al. |
| 10,293,065 B2 | 5/2019 | Victor et al. |
| 10,427,194 B2 | 10/2019 | Westerhoff et al. |
| 10,435,311 B2 | 10/2019 | Hristovski et al. |
| 10,471,277 B2 | 11/2019 | Rhodes et al. |
| 10,590,020 B2 | 3/2020 | Apul et al. |
| 10,765,768 B2 | 9/2020 | Victor et al. |
| 10,793,449 B2 | 10/2020 | Westerhoff et al. |
| 2002/0054744 A1 | 5/2002 | Vanpoulle et al. |
| 2005/0074216 A1 | 4/2005 | Irie |
| 2007/0120522 A1 | 5/2007 | Eickhoff |
| 2008/0019657 A1 | 1/2008 | Maitland et al. |
| 2008/0308405 A1 | 12/2008 | Yu et al. |
| 2010/0091516 A1 | 4/2010 | Harle et al. |
| 2010/0233021 A1 | 9/2010 | Sliwa et al. |
| 2011/0052926 A1 | 3/2011 | Nakamura et al. |
| 2012/0228236 A1 | 9/2012 | Hawkins, II et al. |
| 2012/0321265 A1 | 12/2012 | Terruzzi et al. |
| 2013/0175220 A1 | 7/2013 | Hristovski et al. |
| 2014/0001036 A1 | 1/2014 | Nakanishi et al. |
| 2014/0174905 A1 | 6/2014 | Landry |
| 2014/0352801 A1 | 12/2014 | McAlister |
| 2014/0374270 A1 | 12/2014 | Minegishi et al. |
| 2015/0144802 A1 | 5/2015 | Bauco et al. |
| 2016/0334311 A1 | 11/2016 | Westerhoff et al. |
| 2017/0313601 A1 | 11/2017 | Westerhoff et al. |
| 2018/0080148 A1 | 3/2018 | Westerhoff et al. |
| 2018/0319677 A1 | 11/2018 | Perreault et al. |
| 2019/0056363 A1 | 2/2019 | Westerhoff et al. |
| 2019/0094118 A1 | 3/2019 | Westerhoff et al. |
| 2019/0192879 A1 | 6/2019 | Zaborsky |
| 2020/0031689 A1 | 1/2020 | Hristovski et al. |
| 2020/0158948 A1 | 5/2020 | Westerhoff et al. |
| 2021/0122667 A1 | 4/2021 | Westerhoff et al. |
| 2022/0249719 A1 | 8/2022 | Westerhoff et al. |

FOREIGN PATENT DOCUMENTS

| | | |
|---|---|---|
| JP | 2007130029 | 5/2007 |
| KR | 100909102 | 7/2009 |
| WO | WO 2002057686 | 7/2002 |
| WO | WO 2009140025 | 11/2009 |
| WO | WO 2014/121172 | 8/2014 |
| WO | WO 2014/159874 | 10/2014 |
| WO | WO 2016/197397 | 12/2016 |
| WO | WO 2018236812 | 12/2018 |
| WO | WO 2020/072339 | 4/2020 |
| WO | WO 2020072339 | 4/2020 |

OTHER PUBLICATIONS

Li, Dongdong, Lili Wang, and Gongjian Zhang. "A photocatalytic reactor derived from microstructured polymer optical fiber preform." Optics Communications 286 (2013): 182-186.

Lin, Hongfei, and Kalliat T. Valsaraj. "Development of an optical fiber monolith reactor for photocatalytic wastewater treatment." Journal of Applied Electrochemistry 35.7 (2005): 699-708.

Lin, Hongfei. Photocatalysis in a novel semiconducting optical fiber monolithic reactor for wastewater treatment. Diss. Tsinghua University, China, 1996, 169 pages.

Peill, Nicola J., and Michael R. Hoffmann. "Mathematical model of a photocatalytic fiber-optic cable reactor for heterogeneous photocatalysis." Environmental science & technology 32.3 (1998): 398-404.

Peill, Nicola J., and Michael R. Hoffmann. "Solar-powered photocatalytic fiber-optic cable reactor for waste stream remediation." Journal of solar energy engineering 119.3 (1997): 229-236.

Peill, Nicola Joy. Fiber-optic bundled array cable reactors for heterogeneous photocatalysis and waste stream remediation. Diss. California Institute of Technology, 1997, 250 pages.

Zhu, Rongshu, et al. "A novel fluidized-bed-optical-fibers photocatalytic reactor (FBOFPR) and its performance." Applied Catalysis A: General 471 (2014): 136-141.

U.S. Appl. No. 16/355,016, Cai et al., filed Mar. 15, 2019.

[No Author Listed], "Definition and Procedure for the Determination of the Method Detection Limit, Revision 2," United States Environmental Protection Agency: Washington, DC, Dec. 2016; 8 pages.

[No Author Listed], "Global Water Softener Market 2018-2022: Key Findings and Forecasts: Technavio," Business Wire, Jul. 14, 2018, 6 pages.

[No Author Listed], "Zonyl™ MP 1200," The Chemours Company, 2015, 2 pages.

Adleman et al., "Heterogenous Catalysis Mediated by Plasmon Heating," Nano Letters, 2009, 9(12):4417-4423.

AGC-Chemicals.com [online], "Cytop—Usage: Ultrafast plastic optical fiber 'Fontex'," available on or before Jan. 2, 2019, retrieved on Aug. 11, 2022, retrieved from URL <https://www.agc-chemicals.com/jp/en/fluorine/products/detail/use/detail.html?uCode=JP-EN-F019_5>, 2 pages.

An et al., Lower Molecular Weight Fractions of PolyDADMAC Coagulants Disproportionately Contribute to N-Nitrosodimethylamine Formation during Water Treatment. Water Res. 2019, 150, 466-472.

Arie et al., "Measurement and Analysis of Light Transmission through a Modified Cladding Optical Fiber with Applications to Sensors," Applied Optics, Jun. 1, 1986, 25(11):1754-1758.

Autin et al., Evaluation of a UV-light emitting diodes unit for the removal of micropollutants in water for low energy advanced oxidation processes. Chemosphere. 2013, 92(6):745-751.

Ballato et al., "Silicon optical Fiber," Opt. Express, 2008, 16(23):18675-18683.

Barton et al., "Photocatalytic activity of nanostructured $TiO_2$ coating on glass slides and optical fibers for methylene blue or methyl orange decomposition under different light excitation," J. Photochem. Photobiol. A-Chem., Nov. 2015, 317:72-80.

Beck et al., "Evaluating UV-C Led Disinfection Performance and Investigating Potential Dual-Wavelength Synergy," Water Research, Nov. 7, 2016, 109:207-216.

Bi et al., "Four release tests exhibit variable silver stability from nanoparticle-modified reverse osmosis membranes," Water Research, 2018, 143:77-86.

(56) References Cited

OTHER PUBLICATIONS

Bisyarin et al., "Light-emitting optical fibers with controllable anomalous small-angle scattering," J. Opt. Soc. Am. B, 2017, 34(11):2396-2399.
Bogdanowicz et al., "Improved surface coverage of an optical fibre with nanocrystalline diamond by the application of dip-coating seeding," Diam. Relat. Mater., 2015, 55:52-63.
Bolton et al., Determination of the quantum yields of the potassium ferrioxalate and potassium iodide-iodate actinometers and a method for the calibration of radiometer detectors. J Photochem Photobiol A: Chem., 2011, 222(1):166-169.
Bunge et al, "Rayleigh and Mie scattering in polymer optical fibers," J. Light. Technol., 2006, 24(8):3137-3146.
CASS Central Arizona Salinity Study Phase I, Dec. 2003, retrieved from URL <https://www.phoenix.gov/waterservicessite/Documents/content_wrd_cassph1rpt.pdf>, 58 pages.
CASS Central Arizona Salinity Study Phase II, Sep. 2006, retrieved from URL <https://www.phoenix.gov/waterservicessite/Documents/content_wrc_cass2rpt.pdf>, 22 pages.
Chao et al., "Assessment and optimization of chemical and physicochemical softening processes," Journal American Water Works Association, Mar. 2002, 94(3):109-119.
Chen et al., LED revolution: fundamentals and prospects for UV disinfection applications. Environ. Sci.: Water Res. Technol., 2017, 3(2):188-202.
Chew et al., Elastic Scattering of Evanescent Electromagnetic Waves. Appl. Opt. 1979, 18(15):2679-2687.
Cui et al., "Photo-responsive polymers: properties, synthesis and application," Smart Polymers and their applications, Aguilar, M. R .; San Román, J. (eds)., Woodhead Publishing, 2014, Chapter 4, 41 pages.
Danion et al., "Characterization and study of a single TiO2-coated optical fiber reactor," International Journal of Applied Electromagnetics and Mechanics, 2006, 23:187-201.
Danion et al., "Characterization and study of a single-TiO2-coated optical fiber reactor," Appl. Catal. B-Environ., 2004, 52(3):213-223.
Danion et al., "Optimization of a single TiO2-coated optical fiber reactor using experimental design," J. Photochem. Photobiol. A-Chem., 2004, 168(3):161-167.
Danion et al., "Photocatalytic degradation of imidazolinone fungicide in TiO2-coated optical fiber reactor," Appl. Catal. B-Environ., 2006, 62:274-281.
Danion et al., Malic acid photocatalytic degradation using a TiO2-coated optical fiber reactor, J. Photochem. Photobiol. A-Chem., 2007, 190:135-140.
Doudrick et al., "Detection of Carbon Nanotubes in Environmental Matrices Using Programmed Thermal Analysis," Environ. Sci. Tech., 2012, 46:12246-12253.
Doudrick et al., "Extraction and Quantification of Carbon Nanotubes in Biological Matrices with Application to Rat Lung Tissue," Acs Nano, 2013, 7(10):8849-8856.
Dunne et al., "Micro-Capillary Coatings Based on Spiropyran Polymeric Brushes for Metal Ion Binding, Detection and Release in Continuous Flow", Sensors, Apr. 4, 2018, 18(1083):1-12.
Fayngold, "Interactions Between Evanescent Photons and Environment," submitted Sep. 2, 2014, arXiv:1409.0885, 24 pages.
Fox et al., "Evaluation of Alternatives to Domestic Ion Exchange Water Softener," WateReuse Research Foundation, 2014, 56 pages.
Fries et al., Fabrication of Spiropyran-Containing Thin Film Sensors Used for the Simultaneous Identification of Multiple Metal Ions. Langmuir 2011, 27(19):12253-12260.
Fries et al., "Reversible colorimetric ion sensors based on surface initiated polymerization of photochromic polymers," Chem. Commun., 2008, (47):6288-6290.
Fujino, S. Fabrication of High-Purity Transparent Silica Glass by Powder Sintering Method. New Glas. 2005, 20, 19-24 (with partial English translation).
Gan et al., "Photothermal Contribution to Enhanced Photocatalytic Performance of Graphene-Based Nanocomposites," ACS Nano, Aug. 25, 2014, 8(9):9304-9310.
Gayán et al., Mechanism of the synergistic inactivation of *Escherichia coli* by UV-C light at mild temperatures. Appl Environ Microbiol., 2013, 79(14):4465-4473.
Gifford et al., "Ranking traditional and nano-enabled sorbents for simultaneous removal of arsenic and chromium from simulated groundwater," Sci. Total Environ., Jun. 9, 2017, 601-602:1008-1014.
Global Market Insights [online], "Water Softener Market Size to Exceed $10 Billion by 2024," available on or before Sep. 11, 2018, via Internet Archive: Wayback Machine, 10 pages.
Goldstein et al., The Ferrioxalate and Iodide-Iodate Actinometers in the UV Region J. Photochem. Photobiol. A: Chem., 2008, 193, 50-55.
Haas et al., "Billion-fold rate enhancement of urethane polymerization via the photothermal effect of plasmonic gold nanoparticles," Chem. Sci., Jul. 31, 2015, 6:6462-6467.
Hatchard et al., A New Sensitive Chemical Actinometer. II. Potassium Ferrioxalate as a Standard Chemical Actinometer. Proc R Soc A Math Phys Eng Sci., 1956, 235(1203):518-536.
He et al., "Reshaping inland concentrate management using pretreatment and electrodialysis reversal.," Journal American Water Works Association, Feb. 2014, 106(2):64-67.
Hijnen et al., Inactivation Credit of UV Radiation for Viruses, Bacteria and Protozoan (Oo)Cysts in Water: A Review. Water Res. 2006, 40, 3-22.
Hu et al., Repair and Regrowth of *Escherichia coli* after Low- and Medium-Pressure Ultraviolet Disinfection. Water Sci. Technol.: Water Supply, 2005, 5, 101-108.
International Search Report and Written Opinion in International Appln. No. PCT/US2019/053733, dated Dec. 11, 2019, 9 pages.
Irie, "Properties and applications of photoresponsive polymers," Pure & Appl. Chem., 1990, 62(8):1495-1502.
Jalal et al., "Thermal cycling layer by layer dip coating method for oxazine formation on clad modified optical fiber core," 2014 Int. Conf. Adv. Electr. Eng. (ICAEE), 2014, 4 pages.
Klubben et al., "Novel light diffusing fiber for use in medical applications," In Optical Fibers and Sensors for Medical Diagnostics and Treatment Applications XVI, 2016, 9702:234-239.
Knudson, Photoreactivation of UV-Irradiated *Legionella pneumophila* and Other *Legionella* Species. Appl. Environ. Microbiol., 1985, 49, 975-980.
Kundu et al., Improving the moisture stability of perovskite solar cells by using PMMA/P3HT based hole-transport layers. Mater Chem Front., 2018, 2(1):81-89.
Lanzarini-Lopes et al., "Optical fiber-mediated photosynthesis for enhanced subsurface oxygen delivery," Chemosphere, 2018, 195:742-748.
Lanzarini-Lopes et al., Particle-Modified Polymeric Cladding on Glass Optical Fibers Enhances Radial Light Scattering. J. Opt. Soc. Am. B, 2019, 36(6):1623-1628.
Lin et al., "Enhanced photocatalysis using side-glowing optical fibers coated with Fe-doped TiO2 nanocomposite thin films," J. Photochem. Photobiol. A-Chem., Apr. 15, 2015, 307-308:88-98.
Ling et al., Coupling Light Emitting Diodes with Photocatalyst-Coated Optical Fibers Improves Quantum Yield of Pollutant Oxidation. Environ Sci Technol., 2017, 51(22):13319-13326.
Linsley et al., "Recent advances in light-responsive on-demand drug-delivery systems," Therapeutic Delivery, Jan. 16, 2017, 8(2):89-107.
Lui et al., "Point-of-use water disinfection using ultraviolet and visible light-emitting diodes," Sci. Total Environ., 2016, 553:626-635.
Marinangeli et al., "Photoassisted heterogeneous catalysis with optical fibers," AIChE Journal, Jul. 1977, 23(4):415-426.
Marinangeli et al., "Photoassisted heterogeneous catalysis with optical fibers: 2. Non-isothermal single fiber and fiber bundle," Aiche Journal, Nov. 1980, 26(6):1000-1008.
Markovski et al., "Nano-enabling of strong-base ion-exchange media via a room-temperature aluminum (hydr)oxide synthesis method to simultaneously remove nitrate and fluoride," Sci. Total Environ., 2017, 599:1848-1855.

(56) References Cited

OTHER PUBLICATIONS

Martín-Sómer et al., Influence of light distribution on the performance of photocatalytic reactors: LED vs mercury lamps. Appl Catal B: Environ., 2017, 215:1-7.
Matafonova et al., Recent advances in application of UV light-emitting diodes for degrading organic pollutants in water through advanced oxidation processes: A review. Water Res., 2018, 132:177-189.
nanoComposix.com [online], "Mie Theory Calculator," available on or before Apr. 23, 2019, via Internet Archive: Wayback Machine URL <http://web.archive.org/web/20190423220538/https://nanocomposix.com/pages/mie-theory-calculator#target>, retrieved on Aug. 11, 2022, URL <https://nanocomposix.com/pages/mie-theory-calculator>, 2 pages.
Nebot Sanz et al., Modelling of Reactivation after UV Disinfection: Effect of UV-C Dose on Subsequent Photoreactivation and Dark Repair. Water Res., 2007, 41, 3141-3151.
Nicoletta et al., "Light Responsive Polymer Membranes: A Review," Membranes, 2012, 2:134-197.
Nieuwenhuijsen et al., Chlorination disinfection byproducts in water and their association with adverse reproductive outcomes: a review. Occup Environ Med., 2000, 57(2):73-85.
O'Neal Tugaoen et al., Compact light-emitting diode optical fiber immobilized TiO2 reactor for photocatalytic water treatment. Sci Total Environ., 2018, 613-614:1331-1338.
Oguma et al., Application of UV light emitting diodes to batch and flow-through water disinfection systems. Desalination. 2013, 328:24-30.
Oldenburg, "Light scattering form gold nanoshells," Thesis for the degree of Doctor of Philosophy, Rice University, Jun. 1999, 112 pages.
Peill et al., "Chemical and physical characterization of a TiO2-coated fiber optic cable reactor," Environmental Science & Technology, 1996, 30(9):2806-2812.
Peill et al., "Development and Optimization of a TiO2-Coated Fiber-Optic Cable Reactor: Photocatalytic Degradation of 4-Chlorophenol," Environ. Sci. Technol. 1995, 29(12):2974-2981.
Prieve et al., Scattering of an Evanescent Surface Wave by a Microscopic Dielectric Sphere. Appl. Opt. 1993, 32(9):1629-1641.
Rattanakul et al., Inactivation Kinetics and Efficiencies of UV-LEDs against Pseudomonas Aeruginosa, Legionella Pneumophila, and Surrogate Microorganisms. Water Res. 2018, 130, 31-37.
Rawson, Analysis of scattering from fiber waveguides with irregular core surfaces. Appl Opt. 1974;13(10):2370-2377.
Rawson, Measurement of the Angular Distribution of Light Scattered from a Glass Fiber Optical Waveguide. Appl Opt. 1972;11(11):2477-2481.
Roos et al., "Interpretation of integrating sphere signal output for non-Lambertian samples," Appl. Opt., vol. 27, No. 18, pp. 3833-3837, 1988.
Rosario et al., "Photon-Modulated Wettability Changes on Spiropyran-Coated Surfaces," Langmuir, 2002, 18(21):8062-8069.
Salh, Defect Related Luminescence in Silicon Dioxide Network: A Review. In Crystalline Silicon: Properties and Uses; Basu, S., Ed.; Intech: Croatia, 2011; pp. 135-172.
Santoro et al., "Detailed modeling of oxalic acid degradation by UV-TiO 2 nanoparticles: Importance of light scattering and photoreactor scale-up," Water Res., vol. 121, pp. 361-373, 2017.
Scarmagnani et al., "Photoreversible ion-binding using spiropyran modified silica microbeads," International Journal of Nanomanufacturing, 2010, 5(1-2):38-52.
Schalk et al., UV-Lamps for Disinfection and Advanced Oxidation—Lamp Types, Technologies and Applications; IUVA News: Whistler, BC, Canada, 2005; vol. 8, pp. 32-37.
Sommer et al., UV Inactivation, Liquid-Holding Recovery, and Photoreactivation of Escherichia coli O157 and Other Pathogenic Escherichia coli Strains in Water. J. Food Prot. 2000, 63, 1015-1020.
Song et al., Application of ultraviolet light-emitting diodes (UV-LEDs) for water disinfection: A review. Water Res. 2016, 94:341-349.
Spigulis et al., "Glowing optical fiber design and parameters," Proc. SPIE: Opt. Inorg. Dielectr. Mater. Devices, vol. 2967, No. 2, pp. 231-236, 1997.
Suzuki et al., "Photo-reversible Pb2+-complexation of insoluble poly(spiropyran methacrylate-co-perfluorohydroxy methacrylate) in polar solvents," Chem. Commun., Jul. 10, 2003, (16):2004-2005.
Suzuki et al., "Photo-reversible Pb2+-complexation of thermosensitive poly(N-isopropyl acrylamide-co-spiropyran acrylate) in water," Chem. Commun., Aug. 13, 2004, (18):2036-2037.
Tandon et al., "Nano-engineered optical fibers and applications," Nanophotonics, 2013, 2(5-6):383-392.
Tosa et al., Photoreactivation of Enterohemorrhagic Escherichia coli Following UV Disinfection. Water Res. 1999, 33, 361-366.
Wang et al., "The light transmission and distribution in an optical fiber coated with TiO2 particles," Chemosphere, 2003, 50(8):999-1006.
Wang et al., "Controlling Binding Affinities for Anions by a Photoswitchable Foldamer," Organic Letters, 2010, 12(16):3630-3633.
Wang et al., Highly efficient and stable perovskite solar cells by interfacial engineering using solution-processed polymer layer. J Phys Chem C. 2017, 121(3):1562-1568.
Wei et al., "Stimuli-responsive polymers and their applications," Polym. Chem., 2017, 8:127-143.
Widgoff et al., "Scattering of K+ Particles," Physical Review, 1956, 104(3):811-815.
Wu et al., Ballast Waters Treatment Using UV/Ag—TiO2+O3 Advanced Oxidation Process with Escherichia coli and Vibrio Alginolyticus as Indicator Micro-organisms. Chem. Eng. J. 2011, 174, 714-718.
Xu et al., "Photocatalytic activity on TiO2-coated side-glowing optical fiber reactor under solar light," J. Photochem. Photobiol. A Chem., vol. 199, No. 2-3, pp. 165-169, 2008.
Yaun et al., Response of Salmonella and Escherichia coli O157:H7 to UV Energy. J. Food Prot. 2003, 66, 1071-1073.
Zhi et al., "Loss properties due to Rayleigh scattering in different types of fiber," Opt. Express, vol. 11, No. 1, pp. 39-47, 2003.
Bagwe et al., "Surface modification of silica nanoparticles to reduce aggregation and nonspecific binding," Langmuir. Apr. 25, 2006, 22(9):4357-62.
Bayrakceken et al., "Resonance Fluorescence of Fused Silica by the Depopulation of the Ground State," International Journal of Photoenergy, vol. 2012, Article ID 359384, 3 pages, (Year: 2012).
Belz et al., "Optical detection techniques and light delivery with UV LEDs and optical fibres," Journal of Physics: Conference Series, vol. 85, Third International Conference on Optical and Laser Diagnostics (Icolad 2007) May 22-25, 2007, 7 pages.
Bishop [online], "Summer scholar purifies water with fibers," LLNL, Jul. 26, 2017, URL <https://www.llnl.gov/news/summer-scholar-purifies-water-fibers>, 3 pages.
Glover et al. [online], "Laser Generated Side-emitting Fibers for Anti-microbial Applications," Jan. 12, 2017, URL <https://www.laserchirp.com/2017/01/laser-generated-side-emitting-fibers-for-anti-microbial-applications/>, 6 pages.
Lanzarini-Lopes et al., "Germicidal glowsticks: Side-emitting optical fibers inhibit Pseudomonas aeruginosa and Escherichia coli on surfaces," Water Research, 2020, 184:116191.
Lanzarini-Lopes et al., "Nanoparticle and Transparent Polymer Coatings Enable UV-C Side-Emission Optical Fibers for Inactivation of Escherichia coli in Water," Environmental Science & Technology, 2019, 53(18):10880-10887.
Lanzarini-Lopes, "Visible and Ultraviolet Light Side-Emitting Optical Fibers Enable Water Purification," Dissertation, Arizona State University, May 2020, 209 pages.
Naqvi et al., "Uniform Thin Films on Optical Fibers by Plasma-Enhanced Chemical Vapor Deposition: Fabrication, Mie Scattering Characterization, and Application to Microresonators," Journal of Lightwave Technology, vol. 36, No. 23, pp. 5580-5586, 1 Dec. 1, 2018.

(56) References Cited

OTHER PUBLICATIONS

Rivero et al., "Optical Fiber Sensors Based on Polymeric Sensitive Coatings," Polymers. Mar. 7, 2018; 10(3):280, 26 pages.
Simon, "Optical Fibers for Water Treatment," LLNL, 17-FS-021, 2017, 34 pages.
Spallino et al., "Visible-ultraviolet vibronic emission of silica nanoparticles," Phys. Chem. Chem. Phys., 2014, 16(40):22028-22034.
Suteewong et al., "Highly Aminated Mesoporous Silica Nanoparticles with Cubic Pore Structure," J. Am. Chem. Soc. 2011, 133, 2, 172-175.
Takada et al., "Bactericidal effects of 310 nm ultraviolet light-emitting diode irradiation on oral bacteria," BMC Oral Health (2017) 17:96, 10 pages.
Urrutia et al., "Optical Fiber Sensors Based on Nanoparticle-Embedded Coatings," Journal of Sensors. 2015. 2015:805053. 18 pages.

FIBER-OPTIC INTEGRATED MEMBRANE REACTOR

This application is a divisional of U.S. patent application Ser. No. 15/499,433 entitled "FIBER-OPTIC INTEGRATED MEMBRANE REACTOR" filed on Apr. 27, 2017, which claims the benefit of U.S. Provisional Patent Application 62/328,352 entitled "A FIBER-OPTIC INTEGRATED MEMBRANE REACTOR FOR PHOTOCATALYTIC WATER SPLITTING AND WATER TREATMENT" filed on Apr. 27, 2016, both of which are incorporated by reference herein in their entirety.

STATEMENT OF GOVERNMENT INTEREST

This invention was made with government support under CBET 1132779 and EEC-1449500 awarded by the National Science Foundation. The government has certain rights in the invention.

TECHNICAL FIELD

This invention relates to a reactor for photocatalytic water splitting and water treatment.

BACKGROUND

Photocatalytic water splitting is the photon-driven electrolysis of water to yield hydrogen ($H_2$) and oxygen ($O_2$). FIG. 1 depicts photocatalytic electric cell 100, including anode 102, cathode 104, proton exchange membrane 106, and light source 108. Anode 102 is photocatalytic. Light source 108 initiates oxidation at anode 102, yielding oxygen gas ($O_2$) and protons ($H^+$). Reduction occurs at cathode 104, where the protons are reduced to yield hydrogen gas ($H_2$). Hydrogen gas can be used in industrial processing or as a mobile fuel source. However, development of commercial water splitting reactors has been limited by cost associated with process inefficiencies.

SUMMARY

Devices and methods for photocatalytic water splitting and water treatment are described. In particular, an integrated reactor design includes photocatalyst-coated optical fibers and photon exchange membrane (PEM) elements incorporated into high surface area, high flux modules for production of hydrogen and purification of water. The reactor design allows for use of natural and artificial light sources together with immobilized photocatalysts tuned to absorb photons. Photocatalyst-coated optical fibers allow for illumination of a large surface area of the photocatalyst via light transmitted through the optical fibers. Compact water-splitting modules are formed by including hollow-fiber PEM elements in various configurations. Decoupling of light harvesting and irradiation from hydrogen generation via using fiber optics to introduce light into a compact water-splitting module provides an efficient means to harvest gases (hydrogen, oxygen) that evolve from the catalyst.

In a first general aspect, a reactor for water splitting or water treatment includes a first electrode, a second electrode electrically coupled to the first electrode, and a proton exchange membrane separating the first electrode and the second electrode. The first electrode includes a first optical fiber coated with a photocatalytic material.

Implementations of the first general aspect may include one or more of the following features.

The first optical fiber may be coated with a conductive material. The second electrode may include a second optical fiber, and the second optical fiber may be coated with a conductive material. The second electrode may be in the form of a flexible layer. The proton exchange membrane may be hollow, and the first electrode may be positioned in the proton exchange membrane.

A light source may be coupled to the first optical fiber. The light source may be an artificial light source. The light source may be a light emitting diode. The first electrode may be configured to be coupled to a sunlight-collecting device or to a laser.

The proton exchange membrane may include a first layer and a second layer, and the first electrode may be positioned between the first layer and the second layer.

In a second general aspect, a reactor for water splitting or water treatment includes a reservoir configured to hold water, a multiplicity of hollow fiber proton exchange membranes positioned in the reservoir, a first electrode positioned in each of the hollow fiber proton exchange membranes, where each first electrode includes a first optical fiber coated with a photocatalytic material, and one or more second electrodes positioned in the reservoir, each second electrode electrically coupled to at least one of the first electrodes.

Implementations of the second general aspect may include one or more of the following features.

The photocatalytic material may include titanium dioxide. The first optical fiber may be coated with a conductive material. The conductive material may include indium tin oxide.

A light source may be coupled to each of the first electrodes. The light source may be a light emitting diode.

In a third general aspect, a reactor includes a flexible assembly having a first electrode layer, a second electrode layer, and a third electrode layer. The first electrode layer includes a multiplicity of first electrodes positioned between a first proton exchange membrane layer and a second proton exchange membrane layer. Each of the first electrodes includes an optical fiber coated with a photocatalytic material. The second electrode layer includes a multiplicity of second electrodes positioned between a third proton exchange membrane layer and a fourth proton exchange membrane layer. Each of the second electrodes includes an optical fiber coated with a photocatalytic material. The third electrode layer is positioned between and electrically coupled to the first electrode layer and the second electrode layer. The third electrode layer is a flexible conductive material.

Implementations of the third general aspect may include one or more of the following features.

The flexible assembly may be wound around a porous conduit. The reactor may include a water inlet and a water outlet.

Thus, particular embodiments have been described. Variations, modifications, and enhancements of the described embodiments and other embodiments can be made based on what is described and illustrated. In addition, one or more features of one or more embodiments may be combined. The details of one or more implementations and various features and aspects are set forth in the accompanying drawings, the description, and the claims below.

DETAILED DESCRIPTION

Figure 1:
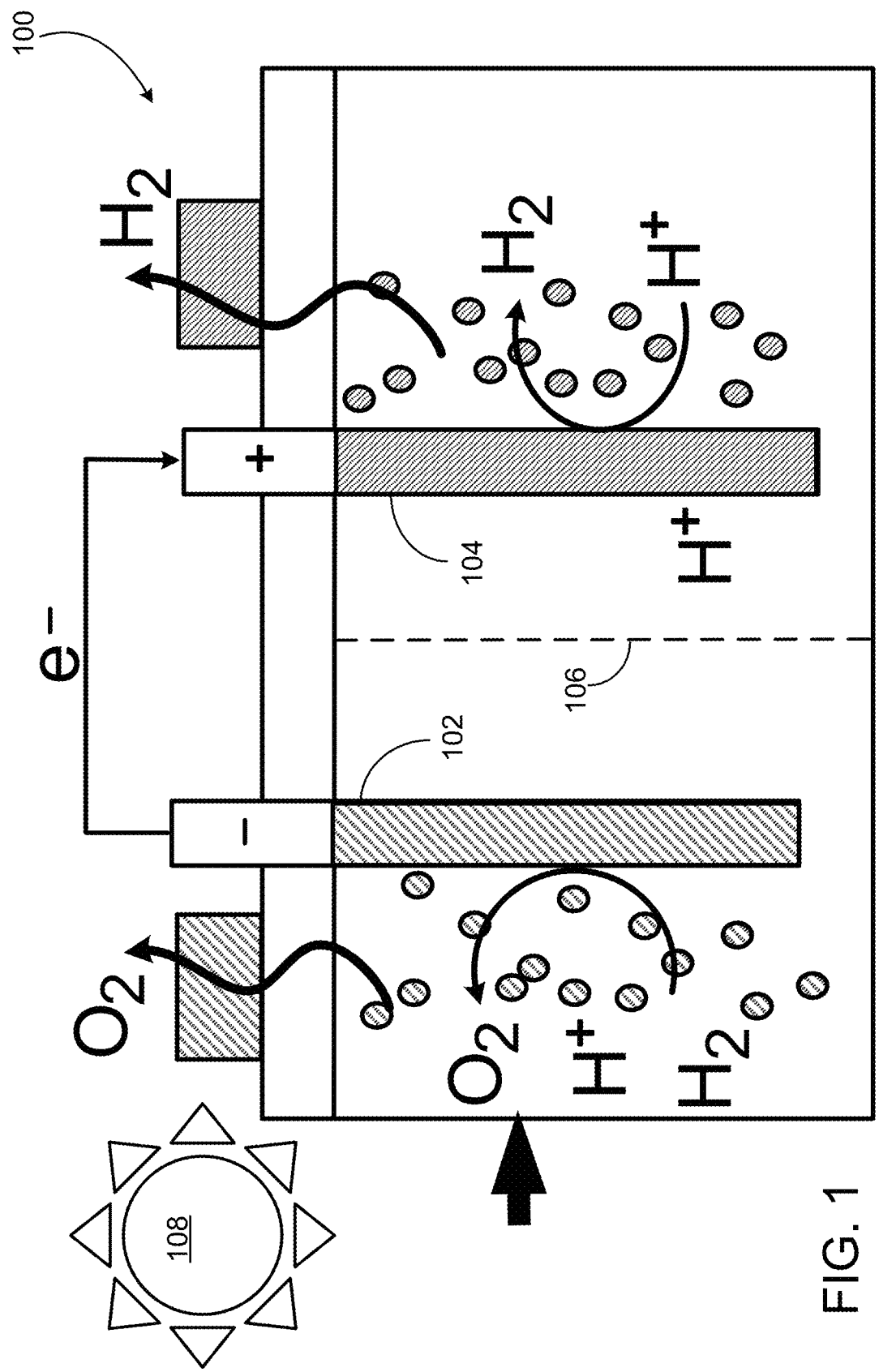
FIG. 1 depicts a photocatalytic electric cell.
Figure 2A:
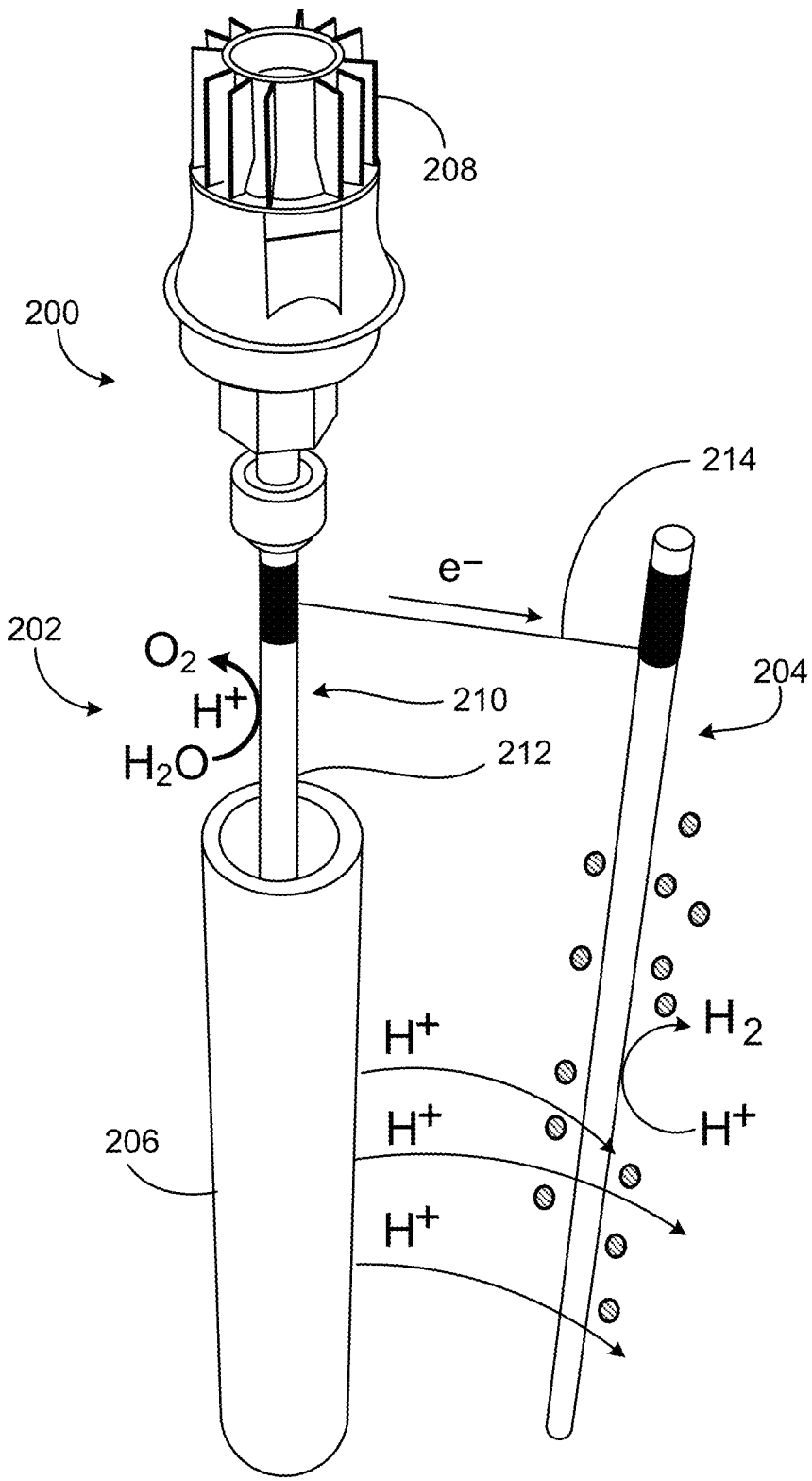
FIG. 2A depicts an exemplary photocatalytic reactor element.

FIG. 2A depicts photocatalytic reactor element 200 including anode 202, cathode 204, proton exchange membrane (PEM) 206, and light source 208. Anode 202 is formed by a coating a portion of optical fiber 210 with conductive photocatalytic coating 212. Cathode 204 may be in the form of an optical fiber with a conductive coating (e.g., platinum, carbon nanotube/graphene on carbon cloth or platinum mesh, or the like). PEM 206 is a hollow fiber membrane. During operation, anode 202, cathode 204, and PEM 206 are immersed in water. In some embodiments, photocatalytic reactor element 200 includes multiple anodes in PEM 206. For simplicity, FIG. 2A does not depict photocatalytic reactor element 200 immersed in water. However, operation of photocatalytic reactor element 200 is described with respect to FIG. 2A as if it were. In embodiments that include multiple photocatalytic reactor elements 200, the number of anodes 202 may exceed the number of cathodes 204. That is, two or more photocatalytic reactor elements 200 may share a single cathode.

Conductive photocatalytic coating 212 includes a photocatalyst as well as a conductive material. An example of a suitable photocatalyst is titanium dioxide ($TiO_2$). An example of a suitable conductive material is indium tin oxide (ITO). Conductive photocatalytic coating 212 on optical fiber 210 provides a large photocatalytic surface area for light transmitted from light source 208 through the optical fiber. Photons absorbed by the photocatalyst induce a current along the surface of optical fiber 210. The conductive material conveys the current along optical fiber 210 to cathode via circuit 214.

As depicted in FIG. 2A, water is oxidized at anode 202 to yield oxygen gas and protons. PEM 206, a flexible, hollow fiber, separates anode 202 from cathode 204 and allows protons to migrate from the anode to the cathode to achieve charge neutrality. In one example, PEM 206 has an internal diameter of 2.2 mm (available from Permapure, USA). Protons react at cathode 204 to produce hydrogen gas. The hydrogen gas may be collected and stored as an energy source or for use in industrial chemical or water treatment processes.

Light source 208 may be a natural or artificial light source. Various light sources can be used to provide photons, and launched into the fiber optics that enter into the modules. For example, natural sunlight can be concentrated using reflective surfaces. Light emitting diodes (LEDs) and lasers are examples of artificial light sources. Suitable light sources can be polychromatic or monochromatic, based upon the absorbance properties of the photocatalyst. Multiple light sources may be used simultaneously, for different fibers, or to span daytime-nighttime solar light availability.

The photocatalyst and the light source may be selected to maximize photon absorption. As depicted in FIG. 2A, light source 208 is a light emitting diode (LED) (e.g., 318 nm LED available from SETI, USA). Radial light emission along the length of optical fiber 210 can be controlled by imparting a selected refractive index on the surface of the optical fiber. In some examples, imparting a selected refractive index on the surface of optical fiber 210 includes sheathing the optical fiber with a material such as glass, polymer, or the photocatalyst itself. Optical fiber 210 provides a high surface area for reaction, and the close proximity of the optical fiber to the PEM reduces the diffusion distance for protons in the water, thereby increasing the overall rate and efficiency of reactor performance.

During operation of photocatalytic reactor element 200, light from light source 208 is provided to (launched into) optical fiber 210 of photocatalytic reactor element. Photons exit optical fiber 210 and excite electrons in conductive photocatalytic coating 212 on the optical fiber. The thickness and composition of the conductive photocatalytic coating influences the wavelength of light absorbed, the extent of electron recombination, and the anodic potential. Electrons flow along the surface of the conductive photocatalytic coating 212 to cathode 204 via conductor 214. Water can be split at anode 202 to produce oxygen and protons. The protons diffuse through PEM 206 and produce hydrogen at cathode 204 using photogenerated electrons. Gases are collected at the top of photocatalytic reactor element 200.

Figure 2B:
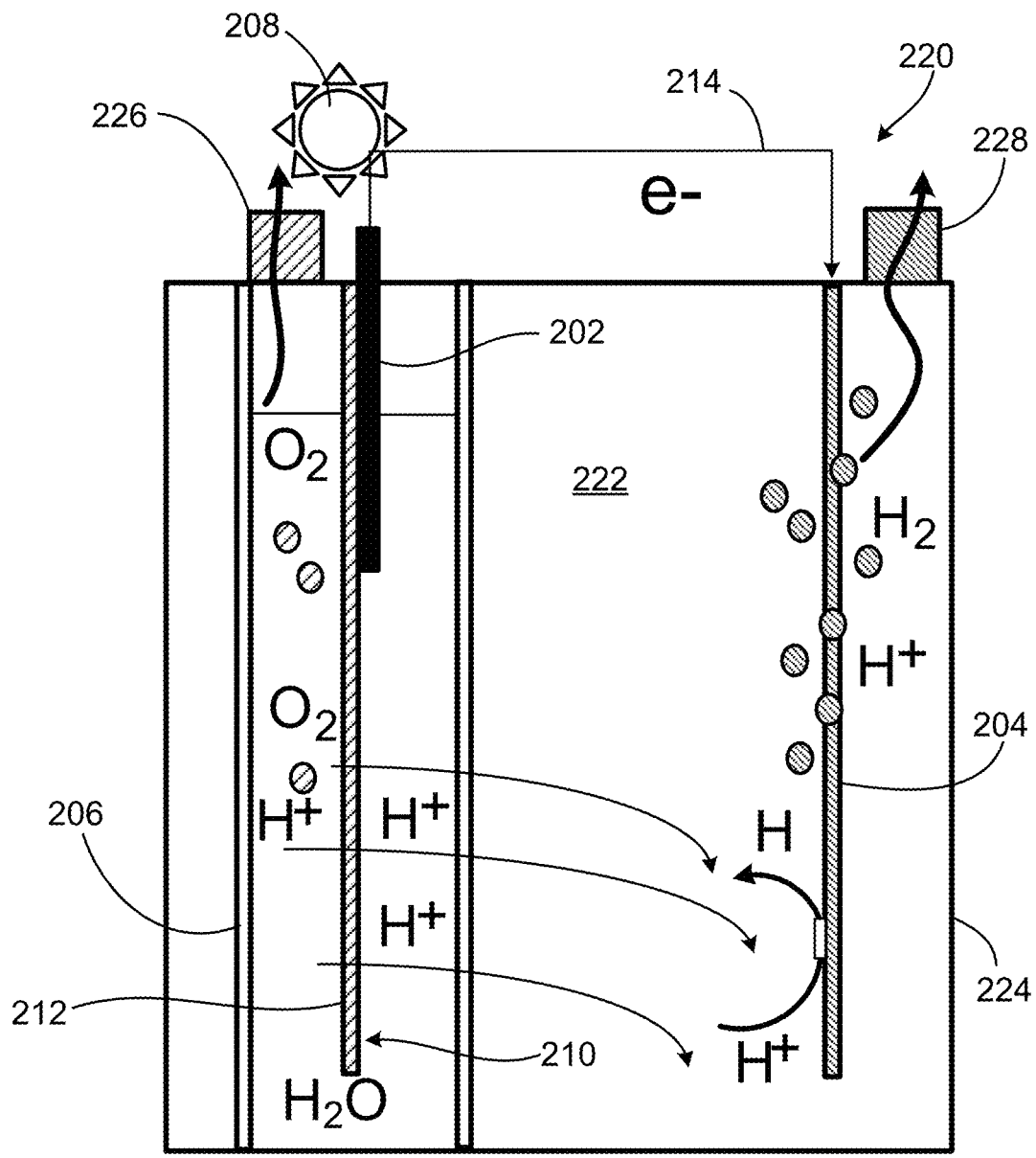
FIG. 2B depicts an exemplary photocatalytic reactor.

FIG. 2B is a cross-sectional view an embodiment of photocatalytic reactor 220 with anode 202, cathode 204, PEM 206, and light source 208. PEM 206 is a hollow fiber membrane. Optical fiber 210, coated with conductive photocatalytic coating 212, is coupled to anode 202. Photons exit optical fiber 210 and excite electrons in conductive photocatalytic coating 212 on the optical fiber. Electrons flow along the surface of conductive photocatalytic coating 212 to cathode 204 via conductor 214. Anode 202 and cathode 204 are positioned in water 222 contained in housing or reservoir 224. Oxygen gas exits photocatalytic reactor 220 via outlet 226 proximate anode 202, and hydrogen gas exits the photocatalytic reactor via outlet 228 proximate cathode 204.

Figure 3:
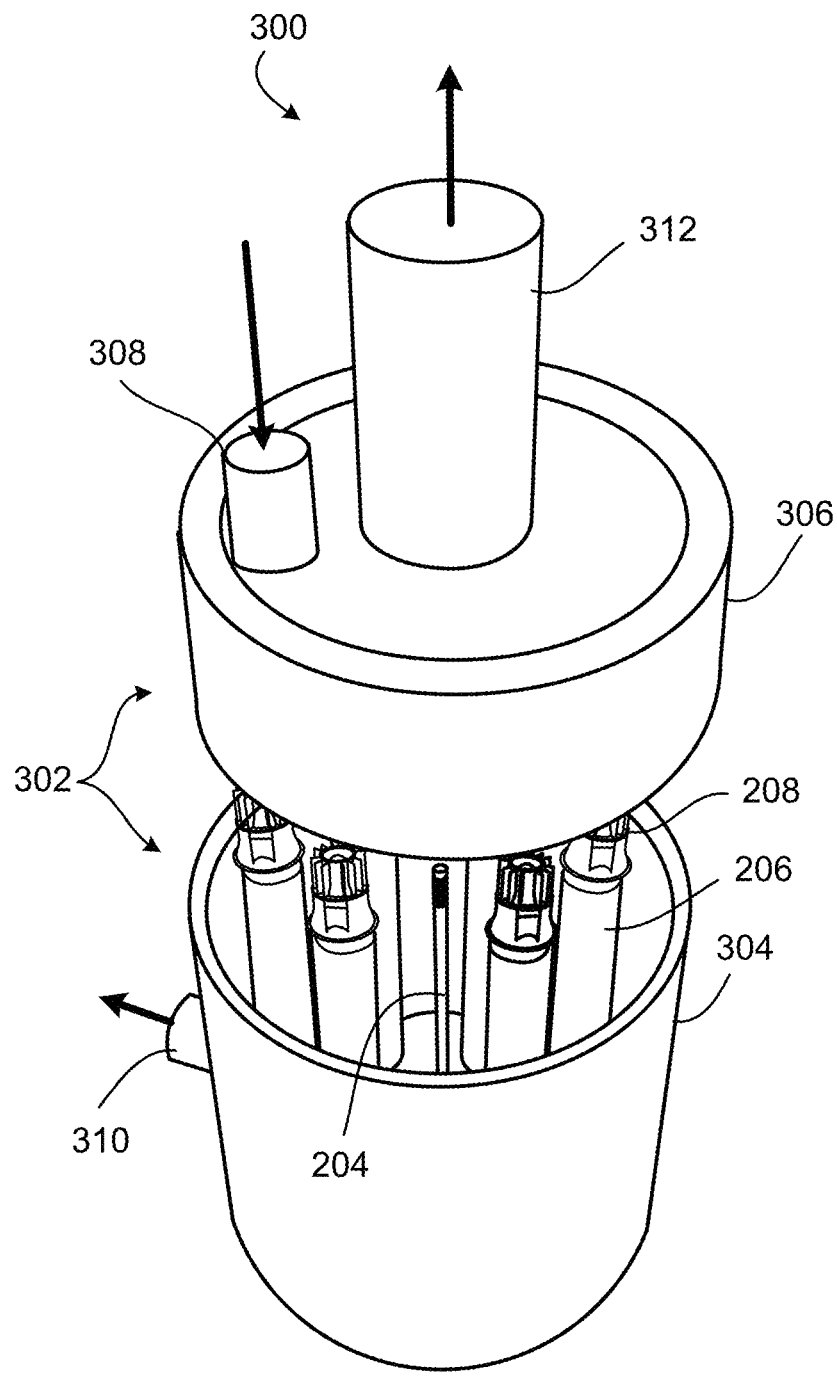
FIG. 3 depicts an exemplary photocatalytic reactor module including a multiplicity of photocatalytic reactor elements.

FIG. 3 depicts exemplary photocatalytic reactor 300. Photocatalytic reactor 300 includes a multiplicity of photocatalytic reactor elements 200. In some examples, photocatalytic reactor 300 includes tens or hundreds of photocatalytic reactor elements 200. Photocatalytic reactor 300 may be implemented as a module in a larger photocatalytic reactor system. In some cases, the number of anodes in photocatalytic reactor 300 is equal to the number of cathodes 204 in the photocatalytic reactor. In certain cases, the number of anodes in photocatalytic reactor 300 exceeds the number of cathodes 204 in the photocatalytic reactor, thereby reducing the use of expensive cathode materials. Cathodes 204 are typically positioned in close proximity to the anodes, thereby increasing reactor efficiency. Photocatalytic reactor elements 200, including cathodes 204, are positioned in water in housing 302. Housing 302 may include reservoir 304 and cover 306.

During operation of photocatalytic reactor 300, water is provided to housing via water inlet 308. The water may be provided to the hollow portion of PEMs 206. Water exits photocatalytic reactor 300 via water outlet 310. Light from light sources 208 is provided (launched) into optical fibers of photocatalytic reactor elements 200. Photons exit the optical fibers and excite electrons in the conductive photocatalytic coating on the optical fibers. The thickness and composition of the conductive photocatalytic coating influences the wavelength of light absorbed, the extent of electron recombination, and the anodic potential. Electrons flow along the surface of the conductive photocatalytic coating to cathodes 204 via circuits (not shown). Water can be split at the anodes (inside photocatalytic reactor elements 200) to produce oxygen and protons. The protons diffuse through PEMs 206 and produce hydrogen at cathodes 204 using photogenerated electrons. Hydrogen is collected via conduit 312 at the top of photocatalytic reactor 300.

Figure 4:
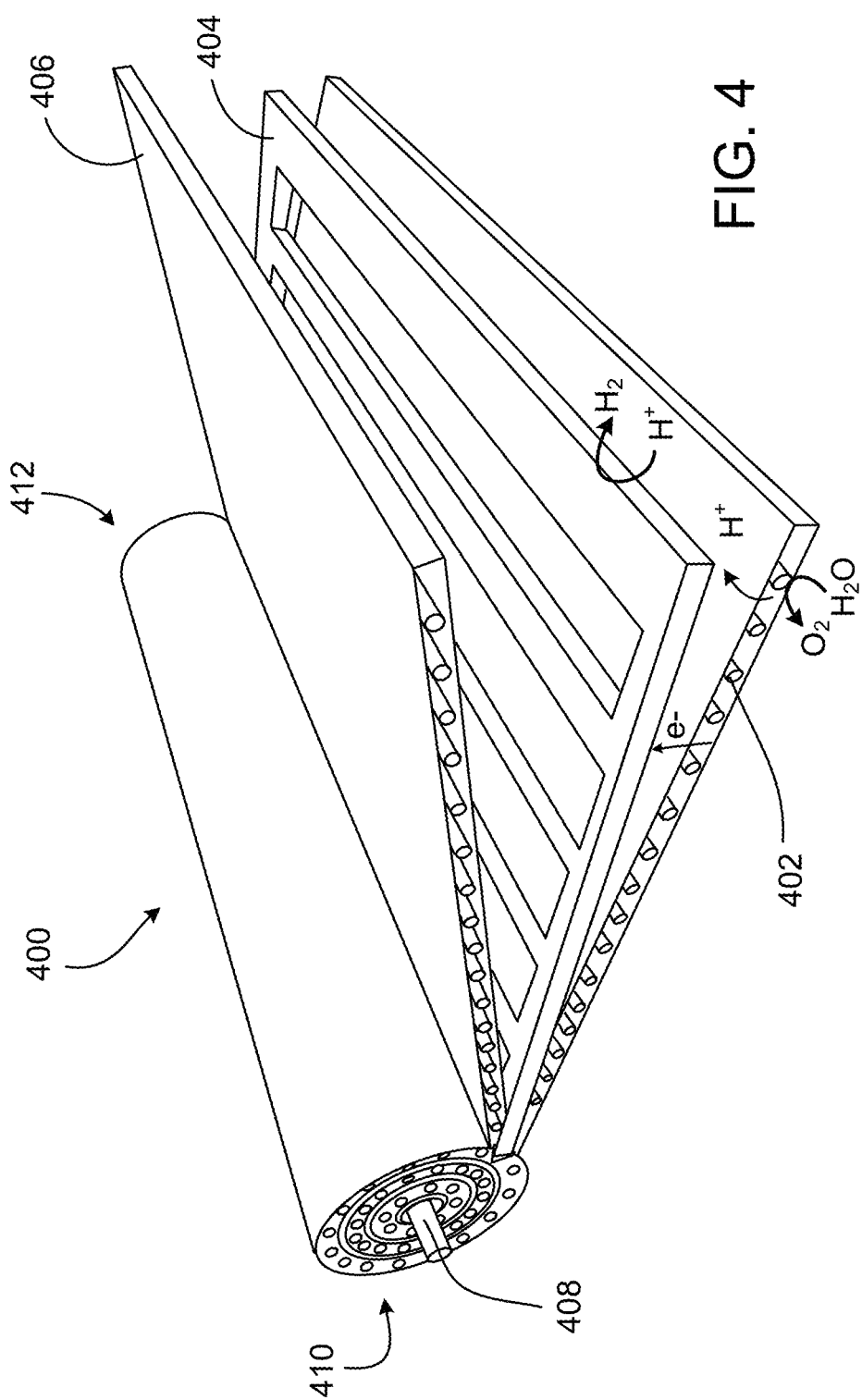
FIG. 4 depicts an exemplary spiral wound photocatalytic reactor.

FIG. 4 depicts spiral wound photocatalytic reactor 400. Spiral wound photocatalytic reactor 400 includes anodes 402 and cathode 404. Anodes 402 may be similar to anodes 202 described with respect to photocatalytic reactor element 200. Anodes 402 serve as spacers between PEM layers 406, and cathode 404 is positioned between two anode layers to yield a layered assembly in the form of a flat sheet. Cathode 404 is flexible, such that the layered assembly may be wound around porous conduit 408 to yield a compact module. Hydrogen produced along the cathode exits spiral wound photocatalytic reactor 400 through porous conduit 408. Water may be provided to PEM layers 406 at first end 410 of spiral wound photocatalytic reactor 400 via an influent fitting, and water and oxygen gas may exit the PEM layers at second end 412 of the spiral wound photocatalytic reactor via an effluent fitting. During operation, spiral wound photocatalytic reactor 400 is positioned such that water entering the reactor flows downward through the PEM layers (e.g., via gravity), and hydrogen gas evolved at cathode 404 bubbles up and is collected at the top of the reactor. Water flow across the PEM layers provides turbulence that improves evolution of hydrogen or other gases from the cathode.

Photocatalytic reactors described herein may be used to achieve water purification. For example, photo-generated electrons (and protons) may be used to reduce oxidized pollutants (e.g., nitrate). Water flow may be increased through the reactor, and a membrane may be selected to function as a PEM and a particulate/molecular cutoff filter to remove particulate, colloidal, and/or dissolved ions. In some cases, the photocatalyst may be selected to produce oxidants (e.g., hydroxyl radicals), to oxidize organic pollutants and/or pathogens. Single or multiple light sources may be used to deliver light of different wavelengths into different fibers. Combinations of uncoated radial emitting fibers with UV light sources may be used for pathogen inactivation, while optical fibers coated with different catalysts create different bandgaps appropriate for destroying different classes of inorganic and organic pollutants in water.

EXAMPLES

Example 1: Remediation of Polluted Groundwater

Figure 5:
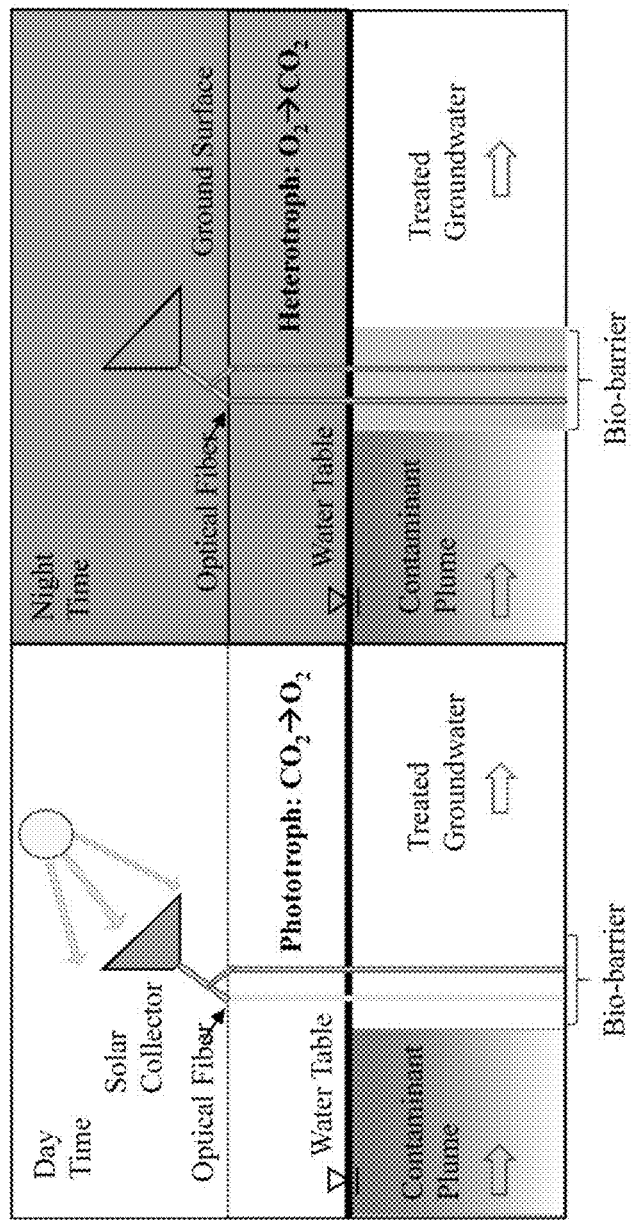
FIG. 5 depicts simulation of biodegradation by growing phototrophs in soils through delivery of natural sunlight to the subsurface.

Bacteria degrade organic groundwater pollutants (e.g., trichloroethylene, methyl tert-butyl ether) when supplied with electron donors (e.g., organic substances) and acceptors (e.g., oxygen). However, the inadequate supply and challenges in delivering oxygen to microbes create an inactive environment with incomplete bioremediation. Biodegradation was simulated by growing phototrophs in soils through delivery of natural sunlight to the subsurface, as depicted in FIG. 5. With sufficient light, phototrophs convert carbon dioxide into cellular materials and generate oxygen. Oxygen acts as an electron acceptor to achieve contaminant biodegradation. Cellular and extracellular organic material provide a substrate for a diverse group of heterotrophs to aid in pollutant degradation. Thus, carbon present in water and soils can be cycled between inorganic and organic forms in a sustainable strategy, rather than continuous addition of electron donors (e.g., methanol).

Photosynthesis allows organisms to biologically produce oxygen. However, sunlight does not typically penetrate soil beyond ~10 mm. Therefore, one factor in using phototrophs in groundwater remediation is delivering light the treatment zone. This example demonstrates subsurface phototroph growth using radially emitting optical fibers to direct light to the subsurface. Oxygen was produced biologically to first enable micro-organism growth and then degrade groundwater pollutants. A white light source was connected to a polymer covered optical fiber that radially emitted light along its length, and the optical fiber was inserted into a packed soil column. The polymer layer allowed the fiber to diffuse light radially along the soil column. Changes in dissolved oxygen (DO) and microbial culture functional structure were monitored when the light was provided continuously and in on-off cycles.

The ability to deliver oxygen and modulate redox conditions on diurnal cycles using solar light to remediate polluted groundwater was demonstrated. Visible light was delivered into the subsurface using uncoated, radially emitting optical fibers. Phototrophic organisms grew near the optical fiber in a packed sand column, and heterotrophic bacteria dominated at longer radial distances from the fiber, presumably supported by soluble microbial products produced by the phototrophs. When applying light in on-off cycles, dissolved oxygen (DO) varied from super saturation levels of >15 mg DO/L in the presence of light to under-saturated conditions of <5 mg DO/L in the absence of light. The redox changes in response to light demonstrated biological delivery of oxygen into the subsurface and supported a diverse microbial community for degrading organic or inorganic ground water pollutants.

Photobioreactor Design and Monitoring

Figure 6:
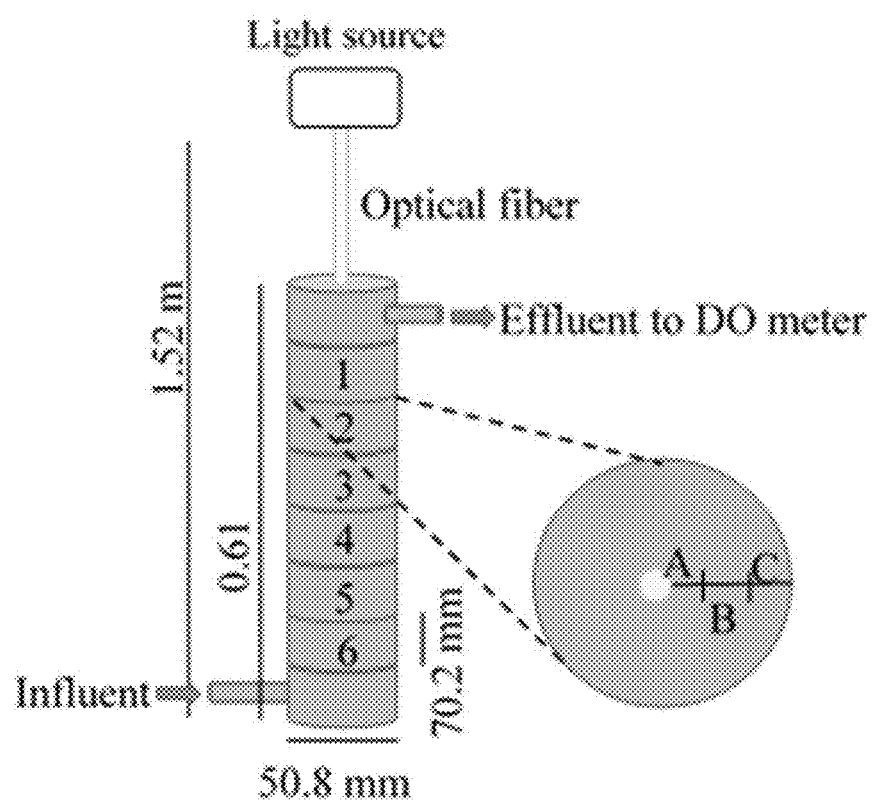
FIG. 6 depicts the sand packed optical fiber reactor (SPOFR) of Example 1.

A Sand Packed Optical Fiber Reactor (SPOFR), 70 cm long by 50.8 mm diameter PVC single column, was packed with 61 cm playground sand, as depicted in FIG. 6. A sponge scouring pad and a layer of granite were placed above and below the playground sand to prevent uneven water flow. Prior to the test, playground sand was mixed with photosynthetic organisms from Tempe Town Lake, Arizona, grown in BG-11, a standard biological growth medium. The composition of BG-11 is provided in Table 1. A 5 mm plastic optical fiber coated in white polymer to emit light radially was positioned through the center of the column and was connected to an artificial visible light source (Encore Fiber Optic Illuminator model AR150CM-4-120M-D-CW with a 150W M type Lamp). Flow rate through the column was 100 mL/day, pumped from reactor bottom to top using a Cole Parmer Masterflex Peristaltic Pump (Vernon Hills, Ill.). An average light intensity of 20 µmol/s-m$^2$ in the visible spectrum (400-700 nm) was emitted through the column continuously for 7 days and then in a 24 hour on-light off-light cycle for 8 days to represent a diurnal light cycle. DO exiting the sand column in response to the light cycles was measured. A dissolved oxygen meter (YSI 550A, Yellow Springs, Ohio) measured influent DO by continuous stir of the inlet batch and effluent DO by inserting the meter in the air-tight flow path. A 50 mL sample was collected for phosphate and nitrate analysis through a 50× dilution using a dual anion/cation ion chromatography instrument (ICS-5000, Dionex).

TABLE 1

BG-11 composition

| Compound | mg/L |
|---|---|
| Boric acid | 2.86 |
| Manganese chloride tetrahydrate | 1.81 |
| Zinc sulfate heptahydrate | 0.22 |
| Copper(II) sulfate pentahydrate | 0.079 |
| Colbalt(II) chloride hexahydrate | 0.05 |
| Sodium molybdate | 0.4 |
| Dipotassium phosphate | 30.5 |
| Magnesium sulfate helptahydrate | 73.5 |
| Calcium chloride | 36.0 |
| Ferric ammonium citrate | 6 |
| Sodium nitrate | 750 |
| Sodium carbonate | 20 |

Microbial Analysis

The density and biological diversity of bacteria along radial and lateral locations in the soil was quantified at the end of the test. The SPOFR was cut into 8 cross sections of 76.2 mm in height. As depicted in FIG. 6, the six center sections were numbered 1-6 and used for microbial analysis. Enumeration of phototrophic and non-phototrophic microorganisms was performed on sections 2, 4, and 6 to determine the radial and vertical distribution of the microorganisms. One gram of the homogenously mixed cross-sectional area was sampled and diluted in 10 mL of water and serially plated onto BG-11 agar plates. The plates were incubated with the same light intensity as the reactor at room temperature. Phototrophic and heterotrophic colonies were counted after incubation for 5 days. DNA was extracted from sections 1, 3, and 5 from 0.25 g samples using a MoBio PowerSoil® DNA Isolation Kit. Microbial community amplicon sequencing using primers 515F and 806R for the V4 hyper-variable region of the 16S rRNA gene was performed using the Illumina MiSeq platform at the Microbiome Analysis Laboratory in the Swette Center for Environmental Biotechnology at Arizona State University.

Oxygen Profiles

Figure 7:
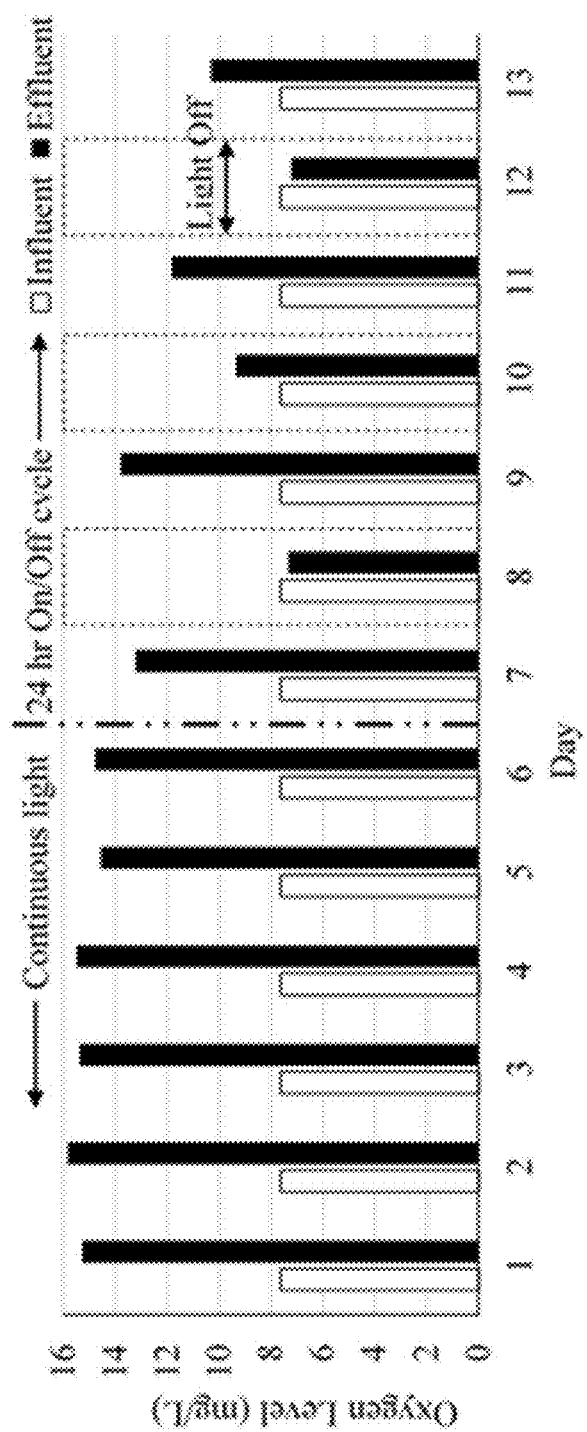
FIG. 7 shows dissolved oxygen levels at the inlet and outlet during bioreactor operation described in Example 1.

FIG. 7 shows the effectiveness of using fiber optics to increase oxygen in a subsurface environment. During days 1-6, continuous light was provided to the reactor filled with water at room temperature (22° C.). Oxygen saturation at 22° C. is 8.7 mg/L. The oxygen concentration of the reactor increased by 7 mg/L to a super-saturated level of 15 mg/L. During light on/off cycles, the DO fluctuated from over saturation to under saturation in response to light delivery. Average DO levels for light on and off cycles were 12.3 mg/L and 7.9 mg/L, respectively.

Increasing DO upon light application is indicative of a photosynthetically active environment. Decreasing DO during off cycles is indicative of consumption of oxygen for aerobic respiration, by photo- or heterotrophic organisms. When no light was supplied to the reactor, DO decreased to 1.5-2 mg/L. This indicates that the oxygen increase in the soil column corresponded to the light availability. During light application, photons promoted photosynthesis, which increased oxygen at a faster rate than the heterotrophs consume. When there was no light, the heterotrophs consumed most of the oxygen.

High levels of nitrate and phosphate were used in the BG-11 media. Changes in these nutrients were additional indicators of biological activity. Nitrogen decreased by an average of 50% from 526 mg/L to 260 mg/L in the initial 5 days of testing then stabilized at a 10% decrease of 70-80 mg/L. Phosphate decreased by 10.5 mg/L (day 4) to 11.7 mg/L (day 12) consistently throughout in both the light-on and light-off cycles. Both nitrogen and phosphorous are required for biomass growth, and the average consumption in these nutrients occurred at a ratio 18.6 mg-N/mg-P, which is close to the redfield ratios in soil and soil bacteria. Nitrate can also act as an electron acceptor. As the oxygen level in the reactor increased, the nitrate consumption decreased.

A control reactor without an optical fiber or light resulted in a 79% decrease in DO (effluent column DO of 1.6 mg/L). Table 2 summarizes the decrease in nitrate, phosphate, and oxygen during the test days. The inlet nitrate and phosphate decreased by 1.5% and 15%, respectively, indicating that the majority of the nutrient reduction was microbially induced and not accounted for by sand adsorption. Collectively, the SPOFR demonstrated production of DO in situ using phototrophic organisms with continuous flow through a simulated groundwater system.

TABLE 2

Reduction in nitrate, phosphate, and oxygen concentrations in a control with no light or photosynthetic organisms

| Concentrations | | Control Day | | | |
|---|---|---|---|---|---|
| (mg/L) | Inlet | 1 | 2 | 3 | 4 |
| Nitrate | 526.7 | 446.7 | 450.2 | 445.6 | 448.3 |
| Phosphate | 12.1 | 12.0 | 12.1 | 11.9 | 11.8 |
| Oxygen | 7.6 | 3.2 | 2.9 | 1.6 | 2.1 |

Biological Profiles

The microbial community profile, determined by plating and high throughput sequencing, illustrated the success of the SPOFR in sustaining a symbiotic community. Both phototrophs and heterotrophs were present. The average density of the heterotrophic microorganisms was 1.19× 10$^5$±2.34×10; CFU/g of sand for all of the samples. The phototrophic microorganism density was consistent throughout the column at 1.36×10$^5$±2.28×10$^3$ CFU/g of sand. Radial samples revealed 3.02×10$^5$ CFU/g of phototrophs in the inner radius and a consistent 7.42×10$^4$ CFU/g beyond 7.62 mm radial distance from the fiber. Table 3 lists microbial density plating results.

TABLE 3

Microbial density plating results

| Microbial Density (CFU/g-sand) | Phototrophs | Standard deviation | Heterotrophs | Standard deviation |
|---|---|---|---|---|
| 2 | 1.5E+05 | 6.5E+03 | 1.6E+05 | 5.3E+03 |
| 4 | 1.0E+05 | 6.9E+03 | 9.8E+04 | 2.6E+03 |

TABLE 3-continued

Microbial density plating results

| Microbial Density (CFU/g-sand) | Phototrophs | Standard deviation | Heterotrophs | Standard deviation |
|---|---|---|---|---|
| 6 | 1.5E+05 | 9.1E+03 | 1.1E+05 | 6.0E+03 |
| Effluent | 0.0E+00 | 0.0E+00 | 9.5E+04 | 8.9E+03 |
| 4A | 3.0E+05 | 3.8E+03 | 1.3E+05 | 1.9E+03 |
| 4B | 7.4E+04 | 8.9E+03 | 1.4E+05 | 2.6E+03 |
| 4C | 7.5E+04 | 2.6E+03 | 9.6E+04 | 7.4E+03 |

The relative abundance of the microorganisms as determined by plating and high throughput sequencing illustrates that the majority of the photosynthetic growth occurred within the first 7.62 mm of the radial profile in both the spread plate and the DNA extraction. The photosynthetic organisms beyond 7.62 mm from the fiber are most likely due to mixing from the water flow. There were no measured photosynthetic organisms in the reactor effluent, suggesting that the photosynthetic microorganisms were tightly bound to the sand inside the bioreactor. The light delivered through the reactor dropped exponentially along the fiber length from inlet to outlet, from 20 μmol/s-m$^2$ at 0 m to 10 μmol/s-m$^2$ at 1.52 m. The higher microorganism count in the top and bottom of the reactor is due to higher light exposure and higher nutrient exposure, respectively.

An average of 60,000 taxonomy counts was found per sample in the SPOFR. Repeatability of the samples from the same area and the relative abundance of each organism are listed in Table 4. The heterotrophs range from nitrogen consuming (Nitrospirae) phylum to oxygen consuming phyla and are widely distributed in the environment. The phototrophs within the bioreactor were a mixture of algae (i.e., Acuodesmus obliquus and Chlorotetraedron incuss) and cyanobacteria (Cyneccoccus spp.). Overall, the microbial community demonstrated a higher spatial distribution in the inner radius of the column. This demonstrates that the optical fibers successfully increased the oxygen to supersaturation levels (15 mg/L) throughout a packed sand reactor. The oxygen increase in the reactor allowed for a syntrophic relationship and growth between the phototrophs and heterotrophs.

Thus, radial emitting optical fibers have been used to deliver light into the subsurface and increase DO due to a biological response to light stimulation. The nutrient consumption provided evidence for biological reactions. Microbial community sequencing indicated that the organisms present in the reactor included both heterotrophs, responsible for the consumption of nitrate and phosphate, as well as phototrophs, responsible for the production in oxygen through the column. There was no reduction in flowrate across the column, suggesting soil clogging may not be an issue.

Example 2: UV-LED Driven Photocatalyst Coated Optical Fiber System

A 318 nm ultraviolet light emitting diode (UV-LED) driven photocatalyst coated optical fiber (UV-LED-OF) system demonstrated in situ activation of photocatalysts by direct photon-electron transfer. Photocatalyst immobilized on coated optical fibers eliminated the need to recover suspended photocatalysts from slurry suspensions, and photonic energy losses due to incident infrared heat dissipation, light transmittance through a liquid phase, or light scattering by suspended slurry photocatalysts were minimized.

The capacity of a UV-LED-OF system with a 318 nm LED to transform methylene blue (MB), a probe pollutant, was evaluated considering both optical fiber coating thickness and photocatalyst attachment method. Performance was compared with that of an equivalent-mass slurry catalyst system. Predicted and measured photon fluence longitudinally through the optical fibers decreased as a function of fiber length and mass of $TiO_2$ externally coated on the fiber. Thinner coatings of $TiO_2$ on the optical fibers led to faster removal rates of MB from solution, presumably related with proximal distance between reactive species produced by $TiO_2$ and MB in the solution. Dip-coated fibers with pre-synthesized $TiO_2$ (i.e., electrostatic attachment) achieved faster MB removal than fibers coated with $TiO_2$ using sol-gel and calcination techniques. $TiO_2$ attached to optical fibers degraded MB faster and achieved a 5× higher quantum efficiency than an equivalent mass of $TiO_2$ suspended in a slurry solution.

Photonic quantum efficiency was quantified as a function of optical fiber coating thickness and photocatalyst synthesis and attachment methodologies. Electrostatic attachment on optical fibers of preformed $TiO_2$ was compared to sol-gel precipitation and calcination directly on optical fibers. Experimental evidence utilizing methylene blue as a probe compound was also supported by modeling.

TABLE 4

Microbial distribution from DNA extraction in ten samples

| Organism | $1_a$ | $1_b$ | $3A_a$ | $3A_b$ | $3B_a$ | $3B_b$ | $3C_a$ | $3C_b$ | $5_a$ | $5_b$ |
|---|---|---|---|---|---|---|---|---|---|---|
| Cyanobacteria (all) | 51.2% | 54.4% | 56.4% | 62.9% | 22.7% | 20.4% | 23.5% | 25.1% | 36.9% | 34.9% |
| Cyanobacteria (other) | 20.6% | 21.9% | 3.3% | 3.7% | 12.1% | 10.9% | 13.4% | 14.3% | 5.6% | 5.3% |
| Cyanobacteria synecccoccus | 19.2% | 20.4% | 45.2% | 50.4% | 3.3% | 3.0% | 0.9% | 1.0% | 21.3% | 20.2% |
| Algae (Acutodesmus Obliquus) | 6.6% | 7.0% | 4.4% | 4.9% | 6.4% | 5.7% | 8.5% | 9.1% | 6.8% | 6.5% |
| Algae (Chlorotetraedron Incuss) | 4.8% | 5.1% | 3.5% | 3.9% | 0.9% | 0.8% | 0.7% | 0.8% | 3.1% | 3.0% |
| Bacteroidetes | 20.8% | 18.6% | 16.9% | 16.3% | 25.0% | 29.8% | 33.2% | 29.5% | 26.6% | 26.4% |
| Proteobacteria | 15.9% | 15.3% | 15.5% | 12.0% | 24.2% | 22.4% | 22.9% | 19.9% | 19.6% | 23.5% |
| Nitrospirae | 0.5% | 1.0% | 2.0% | 1.6% | 7.8% | 6.5% | 1.7% | 5.8% | 4.3% | 4.9% |
| Actinobacteria | 1.1% | 1.4% | 2.5% | 1.3% | 5.0% | 5.2% | 4.3% | 4.4% | 3.7% | 3.1% |
| Verrucomicrobia | 5.0% | 3.5% | 1.6% | 1.5% | 4.7% | 6.8% | 4.7% | 5.3% | 2.6% | 3.0% |
| Planctomycetes | 0.7% | 0.9% | 1.6% | 1.0% | 2.7% | 2.0% | 3.2% | 3.2% | 1.6% | 1.7% |
| Armatimonadetes | 1.5% | 1.6% | 1.1% | 0.6% | 4.4% | 3.0% | 2.5% | 3.0% | 2.3% | 3.2% |

Experimental Methods and Materials

Experiments with UV-LED-OF systems were conducted in a 10 mL glass batch reactor. This volume was selected to enable in situ quantification of methylene blue (Sigma Aldrich) in a spectrophotometer (HACH DR5000) at 664 nm (95000 $M^{-1} \cdot cm^{-1}$). This eliminated the need to remove sample volumes from the reactor for analysis. A 318 nm UV-LED (SETi, UV-TOP) utilized 5 V input at <3 mA was mounted above the reactor. In most cases, a single fiber was polished and attached to the LED. Optical fibers, LED mounts, and additional polishing/stripping equipment were purchased from Thorlabs: FT1000UMT; 0.39 NA, Ø1000 µm Core Multimode Optical Fiber, High-OH for 300-1200 nm, TECS Clad. Optical fibers were prepared by stripping the buffer and cladding, assembly into a quick-connect SMA connector, and polishing the optically active surfaces. Polished fibers were then coated utilizing either electrostatic dip-coating with preformed $TiO_2$ (P25 or P90 obtained from Evonik) or sol-gel synthesis methodologies to achieve different layering thickness and surface homogeneity. The mass of the $TiO_2$ coating layers on the optical fibers was measured gravimetrically by the weight of the optical fibers before and after certain numbers of dip coating cycles (0-20 coating cycles). The surface morphology of the $TiO_2$ coating layers was obtained by scanning electron microscopy (SEM/EDX: Philips XL30-EDAX). The thickness of the $TiO_2$ coating layers on the optical fibers was obtained from SEM images of vertically oriented fibers.

Fiber Stripping and Preparation for Catalyst Deposition 11 cm fiber segments were cut utilizing a ceramic square or ruby blade to achieve a clear cut of the fiber. To remove the TECS cladding and buffer underneath, the fibers were soaked in acetone for 24 hours and the cladding was manually removed. As needed, after a further 24 hours of soaking in acetone, the remaining cladding (a clear coating around the fibers that maintains total internal reflection of the light) was stripped manually. The fibers were then left to soak in water to remove any remaining acetone residual as the catalyst solution was prepared.

Fiber Mounting and Polishing for Enhanced Light Transmission

Fibers were fixed to the metal connector (SM05SMA, Thor Labs) utilizing heat shrink wrap (TT100 1/16" and 1/8", 0.5 cm and 1.5 cm, respectively, Tech-Tron) placed (1) between the stripped fiber and the connector and (2) overlaid on the combined fiber-connector. Heated air was utilized to shrink wrap the components to flush-fit and allowed to cool prior to further treatment or use. Thor Labs ruby blade was utilized to gently score the fiber and cleave along the mechanical axis of the fiber to achieve smooth ends for polishing. Mounted, cleaved fibers were then polished utilizing (D50SMA, Thor Labs) polishing assembly with fiber polishing paper (LF30P, LF5P, LF03P). Fiber microscope was used to determine uniformity of clarity at the fiber tip.

LED mounting to the optical fiber employed a butt-coupling method of direct contact between the LED quartz window and polished optical fiber tip (S5LEDM, SM05M05, SM05SMA, Thor Labs). Male/female SMA pairing allowed for LED housing to connect directly to polished fiber assembly.

Dip Coating Method for $TiO_2$ Deposition

A dispersion of 1% or 2% (10 g/L, 20 g/L) $TiO_2$ (P90, Evonik) was created utilizing the CEINT protocol. The dispersion solution was nanopure water and the appropriate loading of P90 was added to reach 20 g/L, with no additional chemical addition (pH=4.0-4.5). The solution was sonicated in an immersed sonicator horn and maintained stability for up to 48 hours. Two variations of a dip coating protocol were utilized: (1) extended dip/dry cycling and (2) rapid-enhanced dip/dry cycling. For (1), fibers were immersed in the solution for 24 hours to achieve good electrostatic interaction; fibers were then allowed to dry (24 hours) and rinsed with nanopure water to release any excess $TiO_2$ prior to analysis or use. In (2), 30 s dip/dry cycling was conducted with a 2% $TiO_2$ solution for $TiO_2$ deposition and hot-air drying to allow for rapid processing of the optical fibers.

Sol-Gel Method for $TiO_2$ Deposition

To functionalize the optical fiber surface, the optical fibers were first sonicated for 30 min in acetone, ethanol and water, respectively, then rinsed with distilled water and dried with a stream of nitrogen gas. Then the optical fibers were immersed in piranha solution ($H_2O_2$: $H_2SO_4$=1:3, volume ratio) to generate a hydroxyl-functionalized surface. The functionalized optical fibers were rinsed with water and ethanol, respectively, then immersed into 6 mL of ethanol (200 proof) containing titanium isopropoxide (TTIP, 0.6 ml). After 5 min, the fibers were slowly taken out and exposed to air for another 5 min to allow the hydrolysis of TTIP to generate a layer of $TiO_2$ precursor. Repeating the dip-coating process resulted in multiple layers of $TiO_2$ precursor. Optical fibers were dried at 60° C. for 2 h to allow complete hydrolysis, then heated to 500° C. (2° C./min) for 1 h to crystallize the $TiO_2$ particles. As a control, P25 (1 wt %) instead of TTIP was dispersed into ethanol, and used as precursor solution for dip-coating. The samples were characterized by SEM.

Optical fibers were immersed into the reactor containing a test solution with 4.0 µM methylene blue, as a probe contaminant, in double deionized water at a resistivity above 18.2 MΩ-cm (Millipore Inc.). Direct photolysis experiments were conducted by utilizing a 1 cm uncoated optical fiber to launch 318 nm LED irradiation into the solution. Light intensities emitted from the LED and terminal end of the fiber tips were measured by a radiometer (Avaspec 2048L). MB concentrations were measured by absorbance at 664 nm.

Theoretical Calculations of Light Interactions with Coatings on Optical Fibers

Assessment of the mechanism for light penetration from the optical fiber into the catalyst and surrounding aqueous solution helped determine pathways of photon delivery and anticipated photon-electron conversion yields. With coated photocatalyst thickness and mass as primary variables, mathematical modeling of the photonic penetration depth informed desired experimental coating thicknesses.

Excitation in the fiber photocatalyst system is attributed to evanescent energy emitted from optical fibers. Light reflects along the fiber due to total internal reflection (TIR) provided the input angle is greater than the critical angle (ec):

$$\theta_c = \sin^{-1}\left(\frac{n_2}{n_1}\right) \quad \text{Equation 1}$$

where $n_1$ is the index of refraction inside the fiber and $n_2$ is the index outside the fiber (derived from Snell's law with the refracted angle set to 90°, requires $n_2 < n_1$). During TIR, the boundary conditions of Maxwell's equations result in an imaginary wavenumber (k), which produces a corresponding energy field:

$$k = k_y\hat{y} + k_x\hat{x} = i\alpha\hat{y} + \beta\hat{x} \quad \text{Equation 2}$$

$$E(\vec{r}) = E_0 e^{-i(i\alpha\hat{y}+\beta\hat{x})} = E_0 e^{+\hat{y}-i\beta\hat{x}} \quad \text{Equation 3}$$

The flow of this energy (E), called an evanescent wave, is parallel to the waveguide surface, while the z component of the wave (perpendicular to the waveguide) falls off exponentially so that only a limited amount of energy is transmitted into the second medium.

$$E(z) = E(0)e^{-\frac{z}{d}} = \frac{hc}{\lambda}e^{-\frac{z}{d}}; d = \frac{\lambda}{4\pi\sqrt[2]{n_1^2\sin^2\theta - n_2^2}} \quad \text{Equation 4}$$

Figure 8:
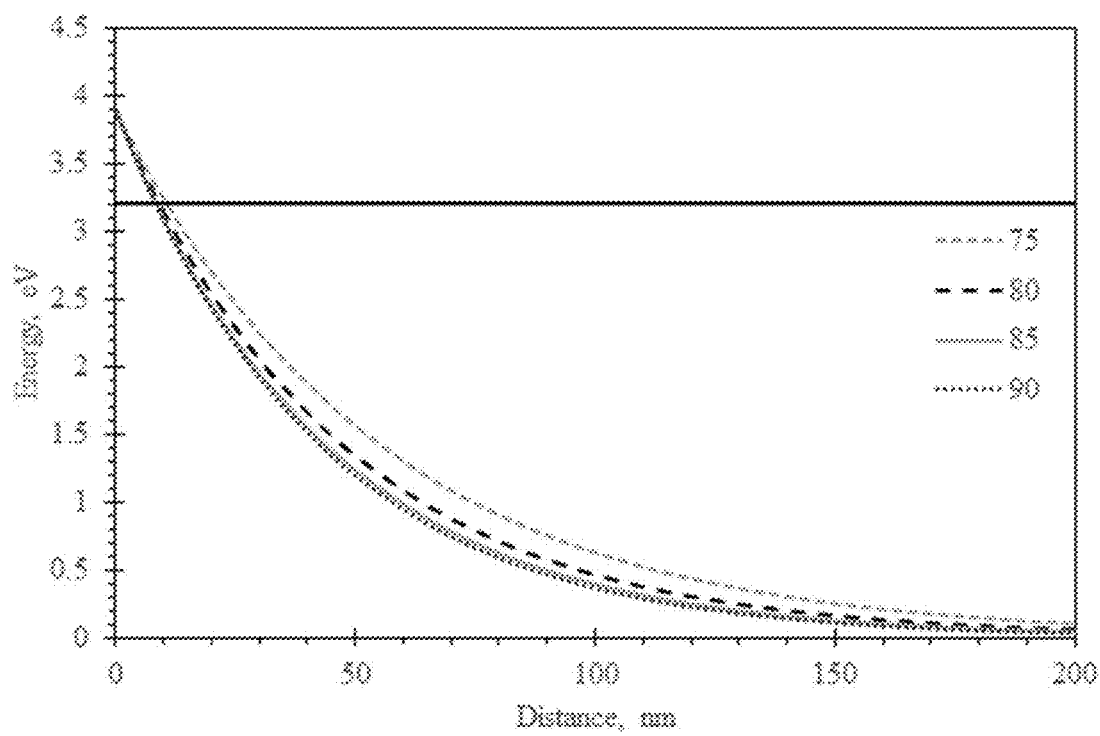
FIG. 8 shows evanescent wave energy with respect to radial distance from the optical fiber surface as a function of photon incident angle for Example 2.

This rapidly decaying energy field is dependent on the wavelength of the light ($\lambda$), the incident angle inside the waveguide ($\theta$), and both $n_1$ and $n_2$. FIG. 8 shows plots of this function in the present system ($\lambda$=318 nm) for incident angles 75°, 80°, 85°, and 90° ($\theta$>74.5° due to the numerical aperture of 0.39). The evanescent field energy falls off as a function of distance from the waveguide surface. The solid horizontal line on the graph shows the bandgap energy necessary (3.2 eV) to excite the $TiO_2$ photocatalyst. The evanescent wave has enough energy to create a photocatalytic exciton in the first ~10 nm outside the fiber (i.e., thickness of photocatalyst coating), a distance comparable to the primary particle size of the $TiO_2$. In this region, the energy is above that of the band gap for $TiO_2$. This modeling suggests that thinner coatings may be more efficient in activating all the $TiO_2$ on the surface.

$TiO_2$ Coating Characterization

Based on the theoretical mechanism for optical fiber light-energy transmission, the dependence of photocatalytic performance on coated thickness, length of optical fiber, and applied light intensity was investigated. The dip coating method yielded 0.02 mg $TiO_2$ on every 7 cm optical fiber for each coating cycle; up to 20 coating cycles were performed. The thickness of the $TiO_2$ coating layers on the optical fibers increased from 0 nm (uncoated) to 1150±60 nm up to 5 coating cycles, then stayed at about 1150 nm even with more coating cycles. The mass increase on the fiber after five coating cycles was attributed to the filling up of cavities on the $TiO_2$ coating layers. SEM of sol-gel samples from titanium isopropoxide (TTIP) and P25 precursors confirm more holistic coverage at for five coating cycles compared to one coating cycle, but do not have the compaction observed with water-based dip-coating.

Optimizing Catalyst-Absorbed Light Intensity

Figure 9:
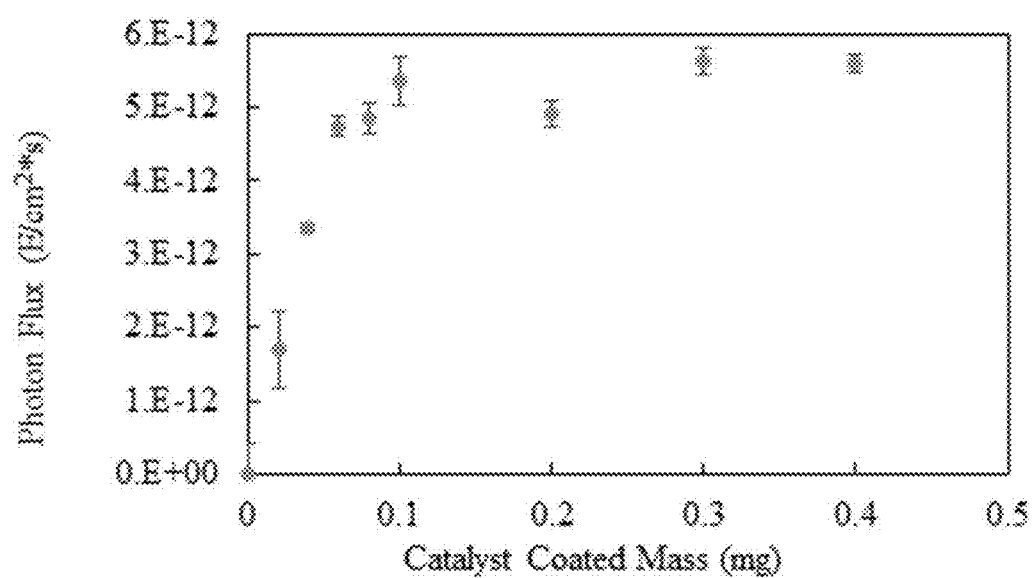
FIG. 9 shows light intensity absorbed in photocatalyst coated optical fibers.

For several different 28 cm long optical fibers coated with between 0.02 mg and 0.1 mg of electrostatically attached $TiO_2$, FIG. 9 shows that higher coated masses of $TiO_2$ resulted in an increase in light intensity absorbed by $TiO_2$ from $1.71 \times 10^{-12}$ ($\pm 5.23 \times 10^{-13}$) Einstein·cm$^{-2}$·s$^{-1}$ to $5.36 \times 10^{-12}$ ($\pm 3.33 \times 10^{-13}$) Einstein·cm$^{-2}$·s$^{-1}$. Light may generate HO·, generate heat (i.e., recombination of electrons and holes), or become scattered. The light intensity absorbed by $TiO_2$ and the coating thickness followed an attenuating trend, where additional coating cycles did not correspond to increased light flux into the catalyst.

Figure 10:
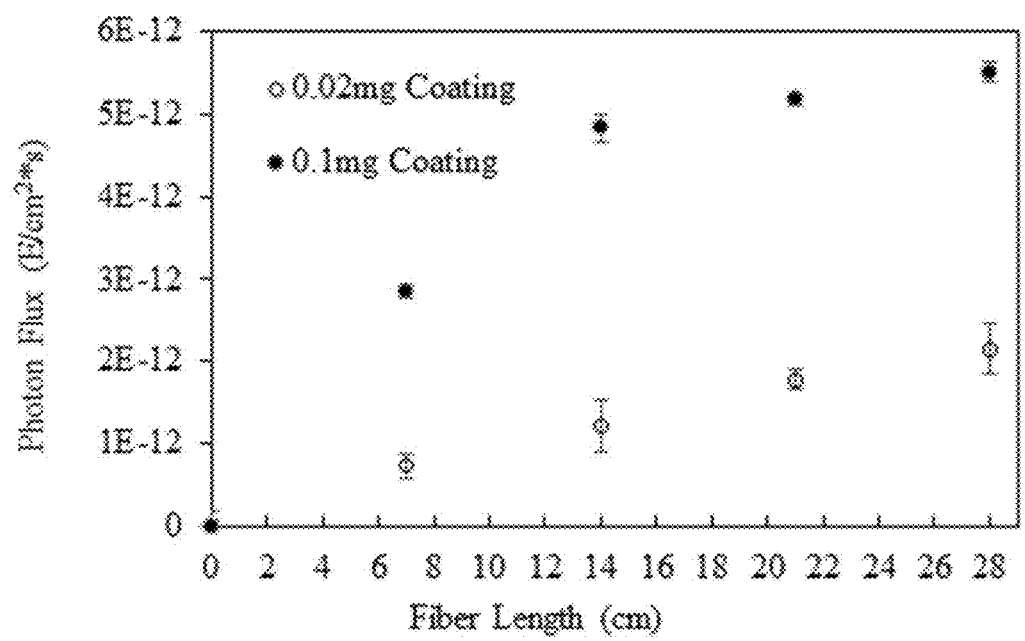
FIG. 10 shows light intensity absorbed in photocatalyst coated optical fibers with fixed coating mass and increasing optical fiber dip coating length.

Another set of experiments was conducted with variable optical fiber lengths but a fixed deposited phototcatalyst mass (0.02 mg $TiO_2$) and resulting fixed thickness of $TiO_2$. FIG. 10 shows the light intensity absorbed by $TiO_2$ increased from $7.20 \times 10^{-13}$ ($\pm 1.39 \times 10^{-1}$)) Einstein·cm$^{-2}$·s$^{-1}$ to $2.15 \times 10^{-12}$ ($\pm 2.99 \times 10^{-13}$) Einstein·cm$^{-2}$·s$^{-1}$ at increasing length of the coated fiber from 7 cm to 28 cm. The light intensity absorbed by $TiO_2$ exhibited a linear relationship (I=(8× $10^{-14}$)×Length, $R^2$>0.98) as a function of the optical fiber length (cm). At an added mass of 0.4 mg, the light intensity absorbed by the $TiO_2$ increased more readily with coated length, from $2.85 \times 10^{-12}$ ($\pm 7.90 \times 10^{-14}$)) Einstein·cm$^{-2}$·s$^{-1}$ to $5.51 \times 10^{-12}$ ($\pm 1.14 \times 10^{-13}$) Einstein·cm$^{-2}$·s$^{-1}$ at 7 cm and 28 cm, respectively.

Quantum Efficiency of the AM-LED-OF System

Figure 11:
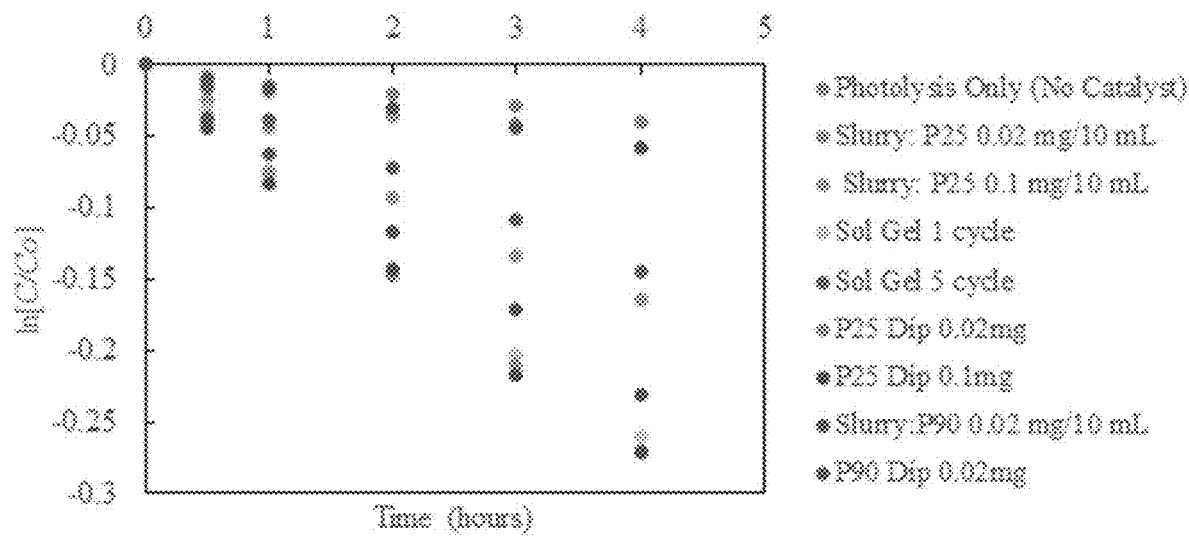
FIG. 11 shows degradation kinetics for methylene blue at different $TiO_2$ doses and coating regimes.

FIG. 11 shows the transformation kinetics of MB at different UV doses. The degradation of MB followed the pseudo-first order kinetics. Without $TiO_2$ present in slurry form or attached to the optical fiber (control), less than 5% of the MB degraded over the 4 hour test. Faster MB degradation occurred when $TiO_2$ was present. For $TiO_2$ present in the mixed slurry reactor, MB degradation rates increased with higher $TiO_2$ dosages but plateaued for dosages above 5 mg/L. It is thought that there may be a limited reaction zone where light penetration into the water-$TiO_2$ slurry occurs and leads to MB degradation. MB degradation rates in the $TiO_2$ slurry reactor were always slower in experiments with equal $TiO_2$ mass attached to optical fibers and the same light irradiance. This suggests that the MB degradation by the slurry system was less effective than that by the fibers.

FIG. 11 also shows that the degradation rates of MB by the dip-coated $TiO_2$ optical fibers at the added mass of 0.2 mg and 1 mg were similar (1%). Although more light was absorbed as the coating layer became thicker as shown in FIG. 9, the extra light absorbed by the thicker coating layer did not produce additional reactive performance. The thicker coating layer enhanced the light absorption, but it may have created barriers for MB to transfer to inner reactive sites on the $TiO_2$ coating layer, creating a non-reactive inert $TiO_2$ coating zone.

An inverse relationship between coating thickness and performance was observed in the sol-gel coated fibers. The kinetic experimental data shown in FIG. 11 is consistent with the theoretical results shown in FIG. 8, indicating that increasing the thickness of the $TiO_2$ coating did not increase the photocatalytic degradation rate.

Figure 12:
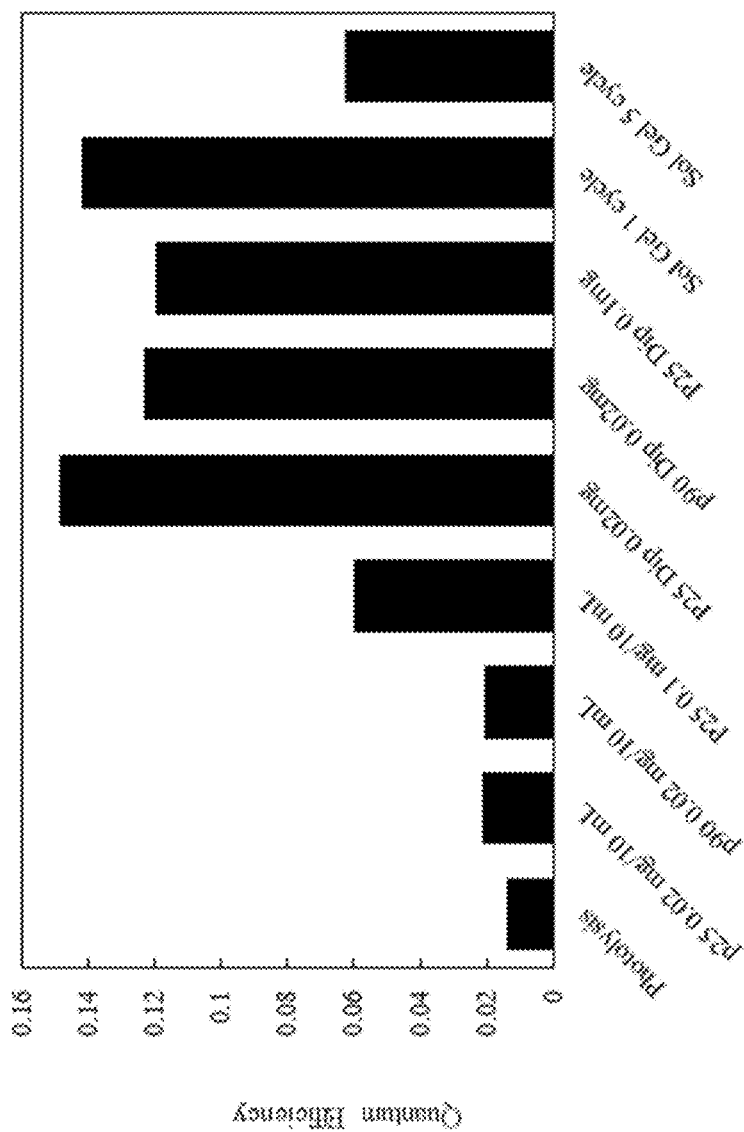
FIG. 12 shows quantum efficiency, $\Phi$, of methylene blue bleaching under photolytic and photocatalytic conditions.

For comparison, the quantum efficiency (QE) of the dip-coated and sol-gel coated fibers and slurry systems at equivalent catalyst doses were calculated as follows:

$$QE = \frac{-k[MB]}{I_{abs}},$$

where k is the pseudo first order reaction rate of MB degradation in different systems, [MB] is the initial methylene blue concentration, and $I_{abs}$ is the light intensity absorbed by the $TiO_2$ coating layer. Due to the direct absorption of light by MB at 318 nm, photolysis contributes additively to the bleaching of MB. FIG. 12 shows QE for photolysis, various slurry conditions with P25 and P90, and dip-coated or sol-gel coated 7 cm optical fiber with one or five coating cycles (0.2 mg to 1 mg equivalent catalyst mass added). The initial MB concentration was 4 μM, and the reactor volume was 10 mL. Slurry based systems are seen to have marginally higher quantum efficiency (QE) than photolysis alone. In contrast, QE for the coated optical fibers was 3× to 10× greater than photolysis alone. The systems with the highest QE were single dip-coating or single sol-gel coating. The data indicates a higher energy utilization efficiency of the fibers compared to the slurry system. Thus, the UV-LED/$TiO_2$/optical-fiber system provides a more energy efficient way to remove pollutants when directly compared to a slurry system of equivalent inputs.

Direct coupling of LEDs to photocatalyst coated optical fibers for in situ irradiation of fixed-film photocatalysts has been demonstrated to remove pollutants in water. Enhanced performance of coated fibers compared to equivalent slurry conditions indicates photon-electron/hole conversion yielding oxidation reaction of the methylene blue in a controlled-catalyst delivery configuration. LEDs provide a narrow-wavelength output for irradiation, capable of targeting pollutants via photolysis or photocatalytic mechanisms while decreasing required energy inputs and systemic inefficiency due to heat losses.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A reactor comprising:
    a flexible assembly comprising:
        a first electrode layer comprising a multiplicity of first electrodes positioned between a first proton exchange membrane layer and a second proton exchange membrane layer, wherein each of the first electrodes comprises an optical fiber coated with an electrically conductive, photocatalytic material;
        a second electrode layer comprising a multiplicity of second electrodes positioned between a third proton exchange membrane layer and a fourth proton exchange membrane layer, wherein each of the second electrodes comprises an optical fiber coated with an electrically conductive, photocatalytic material; and
        a third electrode layer positioned between and electrically coupled to the first electrode layer and the second electrode layer, wherein the third electrode layer is a flexible electrically conductive material,
    wherein the flexible assembly is in the form of a sheet.

2. The reactor of claim 1, wherein the flexible assembly is wound around a porous conduit.

3. The reactor of claim 2, wherein the porous conduit has a first end and a second end.

4. The reactor of claim 3, further comprising a water inlet, wherein the water inlet is configured to direct water toward the first end of the porous conduit.

5. The reactor of claim 4, further comprising a water outlet, wherein the reactor is configured to allow water to flow from the first end of the porous conduit toward the second end of the conduit via gravity.

6. The reactor of claim 1, further comprising a light source coupled to each of the first electrodes and each of the second electrodes.

7. The reactor of claim 6, wherein the light source is an artificial light source.

8. The reactor of claim 7, wherein the light source is a light emitting diode.

9. The reactor of claim 1, wherein each of the first electrodes and second electrodes is configured to be coupled to a sunlight-collecting device.

10. The reactor of claim 1, wherein each of the first electrodes and second electrodes is configured to be coupled to a laser.

11. The reactor of claim 1, wherein each of the first electrodes and second electrodes is coated with an electrically conductive material.

12. A method of producing hydrogen and oxygen from water, the method comprising:
    providing water to a reactor comprising:
        a reservoir; and
        a flexible assembly positioned in the reservoir, the flexible assembly comprising:
            a first electrode layer comprising a multiplicity of first electrodes positioned between a first proton exchange membrane layer and a second proton exchange membrane layer, wherein each of the first electrodes comprises an optical fiber coated with an electrically conductive, photocatalytic material;
            a second electrode layer comprising a multiplicity of second electrodes positioned between a third proton exchange membrane layer and a fourth proton exchange membrane layer, wherein each of the second electrodes comprises an optical fiber coated with an electrically conductive, photocatalytic material; and
            a third electrode layer positioned between and electrically coupled to the first electrode layer and the second electrode layer, wherein the third electrode layer is a flexible electrically conductive material,
        wherein the flexible assembly is in the form of a sheet and wound around a porous conduit;
    providing light into the optical fibers of the first and second electrode layers, thereby yielding photogenerated electrons, wherein the photogenerated electrons flow along the electrically conductive, photocatalytic material of the first and second electrode layers to the third electrode layer; and
    converting the water into oxygen gas and hydrogen gas.

13. The method of claim 12, wherein the water flows through the proton exchange membrane layers from a first end of the reactor to a second end of the reactor via gravity.

14. The method of claim 13, wherein the oxygen gas exits the reactor at the second end of the reactor.

15. The method of claim 14, wherein some of the water exits the reactor at the second end of the reactor.

16. The method of claim 13, wherein the hydrogen gas exits the reactor at the first end of the reactor.

17. The method of claim 16, wherein the hydrogen gas exits the reactor through the porous conduit.

18. The method of claim 12, wherein a flow of the water across the proton exchange membrane layers provides turbulence, thereby improving evolution of the hydrogen gas.

19. The method of claim 12, wherein converting the water into oxygen gas and hydrogen gas comprises producing hydrogen at the third electrode layer using the photogenerated electrons.

* * * * *